United States Patent
Yamazaki et al.

(10) Patent No.: US 9,497,359 B2
(45) Date of Patent: Nov. 15, 2016

(54) SOLID-STATE IMAGING APPARATUS AND ENDOSCOPE APPARATUS

(71) Applicant: OLYMPUS CORPORATION, Tokyo (JP)

(72) Inventors: Susumu Yamazaki, Tokyo (JP); Yoshio Hagihara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 14 days.

(21) Appl. No.: 14/699,242

(22) Filed: Apr. 29, 2015

(65) Prior Publication Data

US 2015/0326800 A1    Nov. 12, 2015

(30) Foreign Application Priority Data

May 8, 2014    (JP) .................................. 2014-097011

(51) Int. Cl.
| | |
|---|---|
| *H04N 5/335* | (2011.01) |
| *H04N 5/217* | (2011.01) |
| *H04N 5/225* | (2006.01) |
| *H04N 5/357* | (2011.01) |
| *H04N 5/3745* | (2011.01) |

(52) U.S. Cl.
CPC ............ *H04N 5/217* (2013.01); *H04N 5/2173* (2013.01); *H04N 5/225* (2013.01); *H04N 5/2253* (2013.01); *H04N 5/335* (2013.01); *H04N 5/357* (2013.01); *H04N 5/3575* (2013.01); *H04N 5/37452* (2013.01); *H04N 5/37457* (2013.01); *H04N 2005/2255* (2013.01)

(58) Field of Classification Search
CPC ....................................................... H04N 5/217
USPC ............................................................ 348/308
See application file for complete search history.

(56) References Cited

FOREIGN PATENT DOCUMENTS

| | | |
|---|---|---|
| JP | 4403387 | 11/2009 |
| JP | 2011-040926 | 2/2011 |

*Primary Examiner* — Usman Khan
(74) *Attorney, Agent, or Firm* — Pillsbury Winthrop Shaw Pittman, LLP

(57) ABSTRACT

A solid-state imaging apparatus includes a plurality of photoelectric conversion sections configured to generate a signal charge according to an amount of an incident light and disposed in a matrix, a first accumulation section configured to accumulate the signal charge, a first transfer section configured to transfer the signal charge from the photoelectric conversion sections to the first accumulation section, a second accumulation section configured to accumulate the signal charge accumulated in the first accumulation section, a second transfer section configured to transfer the signal charge accumulated in the first accumulation section to the second accumulation section, a reset section configured to reset the signal charge accumulated in the second accumulation section, an output section configured to output a signal according to the signal charge accumulated in the second accumulation section, and first and second control sections configured to control each section for every row or column.

15 Claims, 17 Drawing Sheets

SOLID-STATE IMAGING APPARATUS AND ENDOSCOPE APPARATUS

BACKGROUND OF THE INVENTION

Field of the Invention

The present invention relates to a solid-state imaging apparatus and an endoscope apparatus using the solid-state imaging apparatus. Priority is claimed on Japanese Patent Application No. 2014-097011, filed on May 8, 2014, the content of which is incorporated herein by reference.

Description of Related Art

A complementary metal-oxide semiconductor (CMOS) type solid-state imaging apparatus is known as a solid-state imaging apparatus. As an example of the CMOS type solid-state imaging apparatus, a configuration in which noise occurring in a pixel section is reduced for implementing high image quality is disclosed in the publication of Japanese Patent No. 4403387. First, a configuration and an operation of the solid-state imaging apparatus disclosed in the publication of Japanese Patent No. 4403387 will be described.

FIG. 15 shows a configuration example of a conventional solid-state imaging apparatus 200. As shown in FIG. 15, the solid-state imaging apparatus 200 has a pixel 11A, a load transistor 31, and a fixed transistor 32. In the solid-state imaging apparatus 200, a plurality of pixels 11A are disposed in a matrix. In FIG. 15, one pixel 11A is shown. The pixel 11A has a photodiode 21, a transfer transistor 22, a reset transistor 23, an amplification transistor 24, and a selection transistor 25.

The photodiode 21 generates a signal charge according to an amount of an incident light. The transfer transistor 22 transfers the signal charge generated by the photodiode 21 to floating diffusion FD. The operation of the transfer transistor 22 is controlled by a transfer pulse TRF supplied to transfer wiring 26. The reset transistor 23 resets the signal charge accumulated in the floating diffusion FD. The operation of the reset transistor 23 is controlled by a reset pulse RST supplied to reset wiring 28. The amplification transistor 24 amplifies a signal according to the signal charge accumulated in the floating diffusion FD. The selection transistor 25 selects a signal output from the amplification transistor 24 and outputs the selected signal to a vertical signal line 121. The operation of the selection transistor 25 is controlled by a selection pulse SEL supplied to selection wiring 29.

A load transistor 31 and a fixed transistor 32 are connected to the vertical signal line 121. The operation of the load transistor 31 is controlled by a load pulse LOAD. The operation of the fixed transistor 32 is controlled by a fixed pulse FIX.

FIG. 16 shows an operation example of the solid-state imaging apparatus 200. In FIG. 16, waveforms of the load pulse LOAD, the fixed pulse FIX, the selection pulse SEL, the reset pulse RST, and the transfer pulse TRF are shown. In addition, in FIG. 16, a potential of the vertical signal line 121 is shown. The horizontal direction of FIG. 16 represents time and the vertical direction of FIG. 16 represents a voltage.

A source of the fixed transistor 32 is connected to the vertical signal line 121. A drain of the fixed transistor 32 is connected to a voltage Vmid (1.5 V). The voltage Vmid is a voltage lower than a power supply voltage VDD. Before the operation of the pixel 11A of a certain row ends and the operation of the pixel 11A of the next row starts (before the reset operation is performed) in the solid-state imaging apparatus 200, the fixed pulse FIX changes from a Low level to a High level and therefore the fixed transistor 32 is in an ON state. Thereby, a potential of the vertical signal line 121 becomes Vmid.

Thereafter, the operation of the pixel 11A of the next row starts. The load pulse LOAD changes from the Low level to the High level and therefore the load transistor 31 is in the ON state. Simultaneously, the selection pulse SEL changes from the Low level to the High level and therefore the selection transistor 25 is in the ON state. Simultaneously, the reset pulse RST changes from the Low level to the High level and therefore the reset transistor 23 is in the ON state. Thereby, the signal charge accumulated in the floating diffusion FD is reset.

Thereafter, the reset pulse RST changes from the High level to the Low level and therefore the reset transistor 23 is in an OFF state. Thereby, a signal of the reset level is output to the vertical signal line 121. Thereafter, the transfer pulse TRF changes from the Low level to the High level and therefore the transfer transistor 22 is in the ON state. Thereby, the signal charge generated by the photodiode 21 is transferred to the floating diffusion FD.

Thereafter, the transfer pulse TRF changes from the High level to the Low level and therefore the transfer transistor 22 is in the OFF state. Thereby, the signal of the signal level is output to the vertical signal line 121. Thereafter, the load pulse LOAD changes from the High level to the Low level and therefore the load transistor 31 is in the OFF state. Simultaneously, the selection pulse SEL changes from the High level to the Low level and therefore the selection transistor 25 is in the OFF state. Thereafter, the fixed pulse FIX changes from the High level to the Low level and therefore the fixed transistor 32 is in the OFF state.

After the potential of the vertical signal line 121 changes from 0 V to a voltage Vmid in the above-described operation, the signal of the reset level is output to the vertical signal line 121. On the other hand, when there is no fixed transistor 32, the potential of the vertical signal line 121 changes from 0 V to the reset level when the signal of the reset level has been output to the vertical signal line 121. Thus, as compared with when there is no fixed transistor 32, a change in the potential of the vertical signal line 121 due to the reset operation is reduced in period T1 of FIG. 16.

Because the fixed transistor 32 is provided in the solid-state imaging apparatus 200, a change (shaking) in the potential of a well of a pixel capacitively coupled by the vertical signal line 121 and parasitic capacitance is suppressed. Accordingly, noise or shading caused as a result of the change (shaking) in the well potential of the pixel is reduced.

In the conventional solid-state imaging apparatus 200, a scheme of reading signals by driving pixels in units of rows is applied. In this scheme, an operation shown in FIG. 16 is simultaneously performed on all pixels disposed in the same row. In period T11 of FIG. 16, the signal of the reset level output to the vertical signal line 121 of each column is sequentially read in the horizontal direction for every column of the array of the pixels. Likewise, in period T12 of FIG. 16, the signal of the signal level output to the vertical signal line 121 of each column is sequentially read in the horizontal direction for every column of the array of the pixels. That is, between read operations on the signal of the reset level and the signal of the signal level of the same pixel, signals of reset levels or signal levels of a plurality of other pixels are read.

In the above-described scheme, there is a time difference of several µs between a read timing of the signal of the reset level and a read timing of the signal of the signal level of the same pixel. Thus, when the power supply voltage VDD has changed (shaken) between the timings at a low frequency, noise (an error) may be superimposed on a signal output from the pixel as a result of the change. Hereinafter, details will be described.

FIG. 17 shows an operation example when the power supply voltage VDD has changed (shaken) in the conventional solid-state imaging apparatus 200. In FIG. 17, waveforms of the power supply voltage VDD, the reset pulse RST, and the transfer pulse TRF are shown. In addition, in FIG. 17, a potential of the vertical signal line 121 is shown. The horizontal direction of FIG. 17 represents time and the vertical direction of FIG. 17 represents a voltage.

For comparison, the potential of the vertical signal line 121 when the power supply voltage VDD does not change is indicated by a dashed line. When the power supply voltage VDD has changed in a signal read period, the potential of the vertical signal line 121 changes in accordance with a change in the power supply voltage VDD. In FIG. 17, an example in which the potential of the vertical signal line 121 decreases is shown. As a result, noise (an error) by $\Delta V$ occurs in the potential of the vertical signal line 121 as compared with when the power supply voltage VDD does not change in the signal read period.

The aforementioned noise due to the change in the power supply voltage is more significant in an endoscope system in which a solid-state imaging apparatus is mounted on a distal end of an endoscope and the power supply voltage or the like is supplied through a small-diameter cable.

SUMMARY OF THE INVENTION

According to a first aspect of the present invention, a solid-state imaging apparatus includes: a plurality of photoelectric conversion sections configured to generate a signal charge according to an amount of an incident light and disposed in a matrix; a first accumulation section configured to accumulate the signal charge; a first transfer section configured to transfer the signal charge from the photoelectric conversion sections to the first accumulation section; a second accumulation section configured to accumulate the signal charge accumulated in the first accumulation section; a second transfer section configured to transfer the signal charge accumulated in the first accumulation section to the second accumulation section; a reset section configured to reset the signal charge accumulated in the second accumulation section; an output section configured to output a signal according to the signal charge accumulated in the second accumulation section to an output signal line; a first control section configured to control the second transfer section, the reset section, and the output section for every column of an array of the plurality of photoelectric conversion sections; and a second control section configured to control the first transfer section for every row of the array, wherein the first transfer section transfers the signal charge in a first period, wherein the reset section resets the signal charge in a second period different from the first period, wherein the output section outputs a first signal according to the reset signal charge in a third period after the second period, wherein the second transfer section transfers the signal charge in a fourth period after the first and the third period, wherein the output section outputs a second signal according to the transferred signal charge in a fifth period after the fourth period, and wherein, after the first signal and the second signal related to a first column of the array are output, the first signal and the second signal related to a second column different from the first column are output.

According to a second aspect of the present invention, in the solid-state imaging apparatus according to the first aspect, the first accumulation section may include a first capacitor disposed in correspondence with each of the plurality of photoelectric conversion sections, the first transfer section may include a first transistor disposed in correspondence with each of the plurality of photoelectric conversion sections, the second accumulation section may include a second capacitor disposed in correspondence with each of the plurality of photoelectric conversion sections, the second transfer section may include a second transistor disposed in correspondence with each of the plurality of photoelectric conversion sections, the reset section may include a third transistor disposed in correspondence with each of the plurality of photoelectric conversion sections, and the output section may include a fourth transistor disposed in correspondence with each of the plurality of photoelectric conversion sections.

According to a third aspect of the present invention, in the solid-state imaging apparatus according to the first aspect, the first accumulation section may include a first capacitor disposed in correspondence with each of the plurality of photoelectric conversion sections, the first transfer section may include a first transistor disposed in correspondence with each of the plurality of photoelectric conversion sections, the second accumulation section may include a second capacitor commonly disposed in correspondence with two photoelectric conversion sections adjacent in a row direction of the array among the plurality of photoelectric conversion sections, the second transfer section may include a second transistor disposed in correspondence with each of the plurality of photoelectric conversion sections, the reset section may include a third transistor commonly disposed in correspondence with the two photoelectric conversion sections adjacent in the row direction of the array among the plurality of photoelectric conversion sections, and the output section may include a fourth transistor commonly disposed in correspondence with the two photoelectric conversion sections adjacent in the row direction of the array among the plurality of photoelectric conversion sections.

According to a fourth aspect of the present invention, in the solid-state imaging apparatus according to the first aspect, the first transfer section may include a first transistor disposed in correspondence with each of the plurality of photoelectric conversion sections, the second accumulation section may include a second capacitor commonly disposed in correspondence with two photoelectric conversion sections adjacent in a column direction of the array among the plurality of photoelectric conversion sections, the reset section may include a third transistor commonly disposed in correspondence with the two photoelectric conversion sections adjacent in the column direction of the array among the plurality of photoelectric conversion sections, and the output section may include a fourth transistor commonly disposed in correspondence with the two photoelectric conversion sections adjacent in the column direction of the array among the plurality of photoelectric conversion sections.

According to a fifth aspect of the present invention, in the solid-state imaging apparatus according to the fourth aspect, the first accumulation section may include a first capacitor disposed in correspondence with each of the plurality of photoelectric conversion sections, and the second transfer section may include a second transistor disposed in correspondence with each of the plurality of photoelectric conversion sections.

According to a sixth aspect of the present invention, in the solid-state imaging apparatus according to the fourth aspect, the first accumulation section may include a first capacitor commonly disposed in correspondence with the two photoelectric conversion sections adjacent in the column direction of the array among the plurality of photoelectric conversion sections, and the second transfer section may include a second transistor commonly disposed in correspondence with the two photoelectric conversion sections adjacent in the column direction of the array among the plurality of photoelectric conversion sections.

According to a seventh aspect of the present invention, in the solid-state imaging apparatus according to any one of the second, fifth, and sixth aspects, the signal charge related to the second column adjacent to the first column may be reset simultaneously when the first signal related to the first column of the array is output, and subsequently the first signal and the second signal related to the second column may be output after the second signal related to the first column is output.

According to an eighth aspect of the present invention, in the solid-state imaging apparatus according to the first aspect, the first accumulation section may have a first capacitor disposed in correspondence with each of the plurality of photoelectric conversion sections, the first transfer section may have a first transistor disposed in correspondence with each of the plurality of photoelectric conversion sections, the second accumulation section may have a second capacitor commonly disposed in correspondence with four photoelectric conversion sections adjacent in row and column directions of the array among the plurality of photoelectric conversion sections, the second transfer section may have a second transistor disposed in correspondence with each of the plurality of photoelectric conversion sections, the reset section may have a third transistor commonly disposed in correspondence with the four photoelectric conversion sections adjacent in the row and column directions of the array among the plurality of photoelectric conversion sections, and the output section has a fourth transistor commonly disposed in correspondence with the four photoelectric conversion sections adjacent in the row and column directions of the array among the plurality of photoelectric conversion sections.

According to a ninth aspect of the present invention, in the solid-state imaging apparatus according to the third or eighth aspect, after the first signal and the second signal related to the first column of the array are output, the first signal and the second signal related to a second column adjacent to the first column may be output.

According to a tenth aspect of the present invention, in the solid-state imaging apparatus according to the third or eighth aspect, after the signal charge related to the first column which is one of an even-numbered column and an odd-numbered column of the array and the signal charge related to the second column which is the other of the even-numbered column and the odd-numbered column are simultaneously reset, the first signal and the second signal related to the first column may be output and subsequently the first signal and the second signal related to the second column may be output.

According to an eleventh aspect of the present invention, an endoscope apparatus includes the solid-state imaging apparatus according to the first aspect.

DETAILED DESCRIPTION OF THE INVENTION

Hereinafter, embodiments of the present invention will be described with reference to the drawings.

(First Embodiment)

Figure 1:
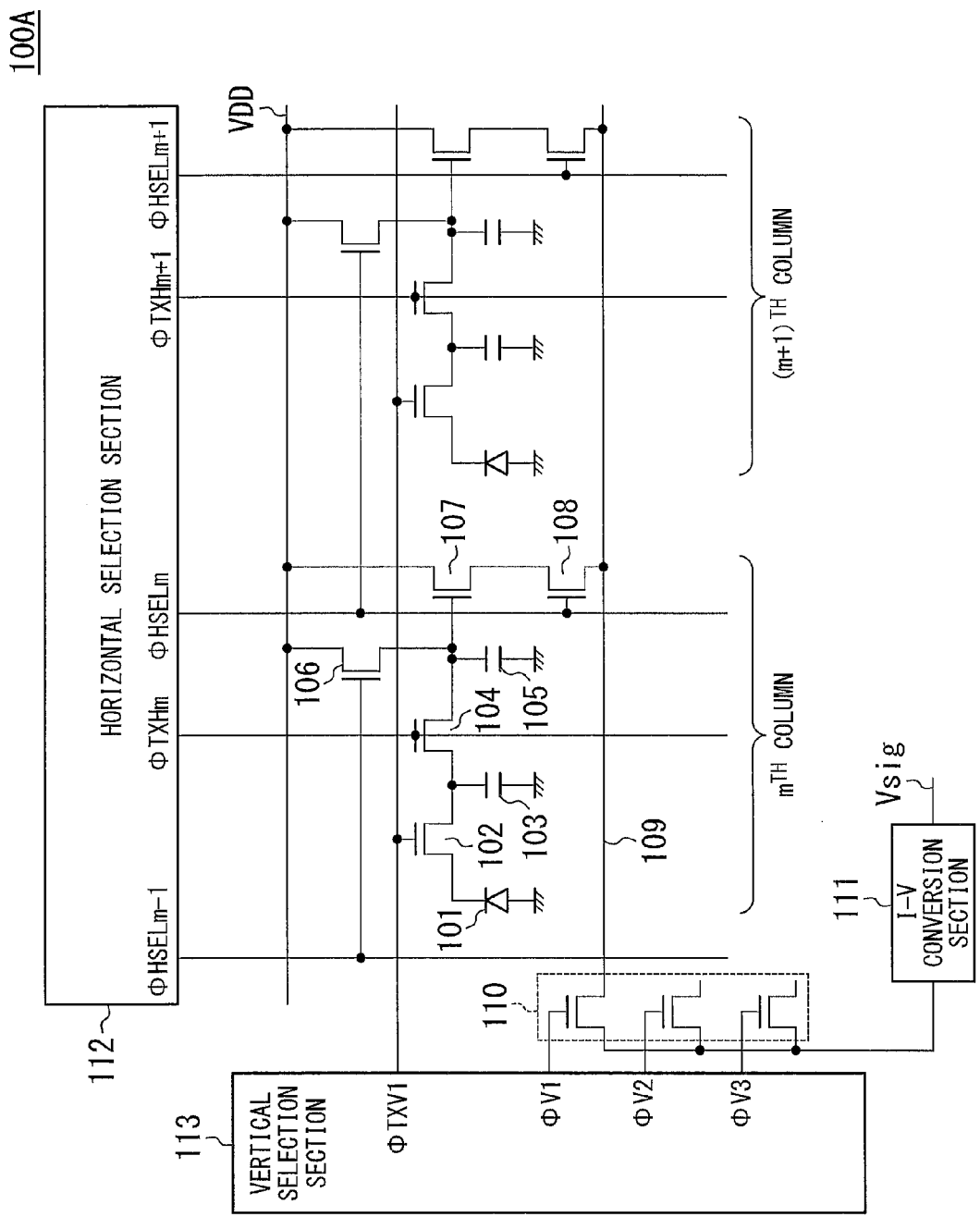
FIG. 1 is a circuit diagram showing a configuration example of a solid-state imaging apparatus according to a first embodiment of the present invention.

First, the first embodiment of the present invention will be described. FIG. 1 shows a configuration example of a solid-state imaging apparatus 100A according to this embodiment. As shown in FIG. 1, the solid-state imaging apparatus 100A has a photoelectric conversion section 101, a first transfer section 102, a first accumulation section 103, a second transfer section 104, a second accumulation section 105, a reset section 106, an amplification section 107, a selection section 108, an output switch 110, an I-V conversion section 111, a horizontal selection section 112, and a vertical selection section 113.

In the solid-state imaging apparatus 100A, a plurality of photoelectric conversion sections 101 are disposed in a matrix. In FIG. 1, two photoelectric conversion sections 101 are shown. The first transfer section 102, the first accumulation section 103, the second transfer section 104, the second accumulation section 105, the reset section 106, the amplification section 107, and the selection section 108 are disposed for every row and every column of the array of the plurality of photoelectric conversion sections 101.

The photoelectric conversion section 101, the first transfer section 102, the first accumulation section 103, the second transfer section 104, the second accumulation section 105, the reset section 106, the amplification section 107, and the selection section 108 constitute one pixel. In the solid-state imaging apparatus 100A, a plurality of pixels are disposed in the matrix. In FIG. 1, a pixel in a first row and an $m^{th}$ column and a pixel in the first row and an $(m+1)^{th}$ column are shown. m is a natural number greater than or equal to 1.

The photoelectric conversion section 101 generates a signal charge according to an amount of an incident light. The photoelectric conversion section 101 is configured as a photodiode. A first end of the photoelectric conversion section 101 is connected to the ground.

The first transfer section 102 transfers the signal charge generated by the photoelectric conversion section 101 from the photoelectric conversion section 101 to the first accumulation section 103. The first transfer section 102 is configured as a transistor (first transistor) disposed in correspondence with each of the plurality of photoelectric conversion sections 101. A drain of the first transfer section 102 is connected to a second end of the photoelectric conversion section 101. An operation of the first transfer section 102 is controlled by a first transfer pulse ΦTXV as a control signal supplied from the vertical selection section 113 to the gate of the first transfer section 102. In FIG. 1, a first transfer pulse ΦTXV1 to be supplied to the first transfer section 102 of the first row is shown.

The first accumulation section 103 accumulates the signal charge transferred by the first transfer section 102. The first accumulation section 103 is configured as a capacitor (first capacitor) disposed in correspondence with each of the plurality of photoelectric conversion sections 101. The first end of the first accumulation section 103 is connected to a source of the first transfer section 102.

The second end of the first accumulation section 103 is connected to the ground.

The second transfer section 104 transfers the signal charge accumulated in the first accumulation section 103 to the second accumulation section 105. The second transfer section 104 is configured as a transistor (second transistor) disposed in correspondence with each of the plurality of photoelectric conversion sections 101. The drain of the second transfer section 104 is connected to the first end of the first accumulation section 103. An operation of the second transfer section 104 is controlled by a second transfer pulse ΦTXH as a control signal supplied from the horizontal selection section 112 to the gate of the second transfer section 104. In FIG. 1, a second transfer pulse ΦTXHm to be supplied to the second transfer section 104 of the $m^{th}$ column and a second transfer pulse ΦTXHm+1 to be supplied to the second transfer section 104 of the $(m+1)^{th}$ column are shown.

The second accumulation section 105 accumulates the signal charge accumulated in the first accumulation section 103 and transferred by the second transfer section 104. The second accumulation section 105 is configured as a capacitor (second capacitor) disposed in correspondence with each of the plurality of photoelectric conversion sections 101. A first end of the second accumulation section 105 is connected to the source of the second transfer section 104. A second end of the second accumulation section 105 is connected to the ground.

The reset section 106 resets the signal charge accumulated in the second accumulation section 105. The reset section 106 is configured as a transistor (third transistor) disposed in correspondence with each of the plurality of photoelectric conversion sections 101. The drain of the reset section 106 is connected to the power supply voltage VDD. The source of the reset section 106 is connected to the first end of the second accumulation section 105. An operation of the reset section 106 is controlled by a selection pulse ΦHSEL as a control signal supplied from the horizontal selection section 112 to the gate of the reset section 106. In FIG. 1, a selection pulse ΦHSELm-1 to be supplied to the reset section 106 of the $m^{th}$ column and a selection pulse ΦHSELm to be supplied to the reset section 106 of the $(m+1)^{th}$ column are shown.

The amplification section 107 amplifies a signal according to the signal charge accumulated in the second accumulation section 105 and outputs the amplified signal. The amplification section 107 is configured as a transistor disposed in correspondence with each of the plurality of photoelectric conversion sections 101. The drain of the amplification section 107 is connected to the power supply voltage VDD. The gate of the amplification section 107 is connected to the first end of the second accumulation section 105.

The selection section 108 selects a signal output from the amplification section 107, and outputs the selected signal to the output signal line 109. The amplification section 107 and the selection section 108 are an output section which outputs the signal according to the signal charge accumulated in the second accumulation section 105 to the output signal line 109. The amplification section 107 and the selection section 108 are configured as transistors (fourth transistors) disposed in correspondence with each of the plurality of photoelectric conversion sections 101. The drain of the selection section 108 is connected to the source of the amplification section 107. The source of the selection section 108 is connected to the output signal line 109 disposed for every row. An operation of the selection section 108 is controlled by the selection pulse ΦHSEL as a control signal supplied from the horizontal selection section 112 to the gate of the selection section 108. In FIG. 1, a selection pulse ΦHSELm to be supplied to the selection section 108 of the $m^{th}$ column and a selection pulse ΦHSELm+1 to be supplied to the selection section 108 of the $(m+1)^{th}$ column are shown. The selection pulse ΦHSEL is a common control signal between the reset section 106 and the selection section 108.

The output switch 110 outputs the signal output to the output signal line 109 to the I-V conversion section 111. The output switch 110 has a plurality of transistors disposed for every row of the array of the plurality of photoelectric conversion sections 101. The operation of the output switch 110 is controlled by an output pulse ΦV as a control signal supplied from the vertical selection section 113 to the gate of the transistor constituting the output switch 110. In FIG. 1, an output pulse ΦV1 of the first row, an output pulse ΦV2 of the second row, and an output pulse ΦV3 of the third row are shown.

The I-V conversion section 111 converts a current of the signal output from the output switch 110 into a voltage and outputs a signal Vsig.

The horizontal selection section 112 outputs a control signal for controlling the second transfer section 104, the reset section 106, and the selection section 108. The horizontal selection section 112 is a first control section which controls the second transfer section 104, the reset section 106, and the selection section 108 for every column of the array of the plurality of photoelectric conversion sections 101.

The vertical selection section 113 outputs a control signal for controlling the first transfer section 102 and the output switch 110. The vertical selection section 113 is a second control section which controls the first transfer section 102 for every row of the array of the plurality of photoelectric conversion sections 101.

In this embodiment, the first transfer section 102 is driven by the vertical selection section 113 and the second transfer section 104 is driven by the horizontal selection section 112. Thereby, the signal of the reset level and the signal of the signal level can be read at different timings for every photoelectric conversion section 101 (every pixel).

Figure 2:
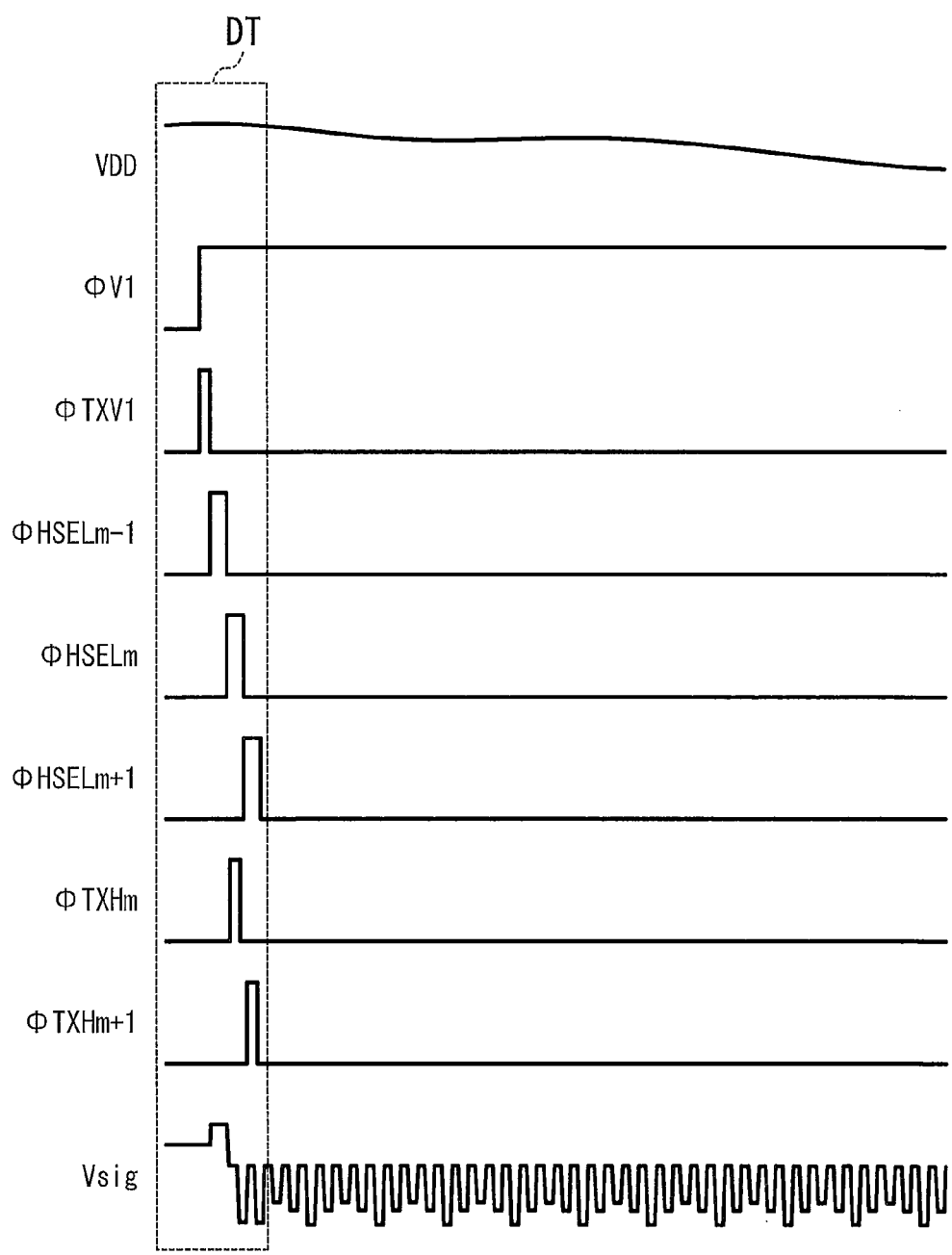
FIG. 2 is a timing chart showing an operation example of the solid-state imaging apparatus according to the first embodiment of the present invention.
Figure 3:
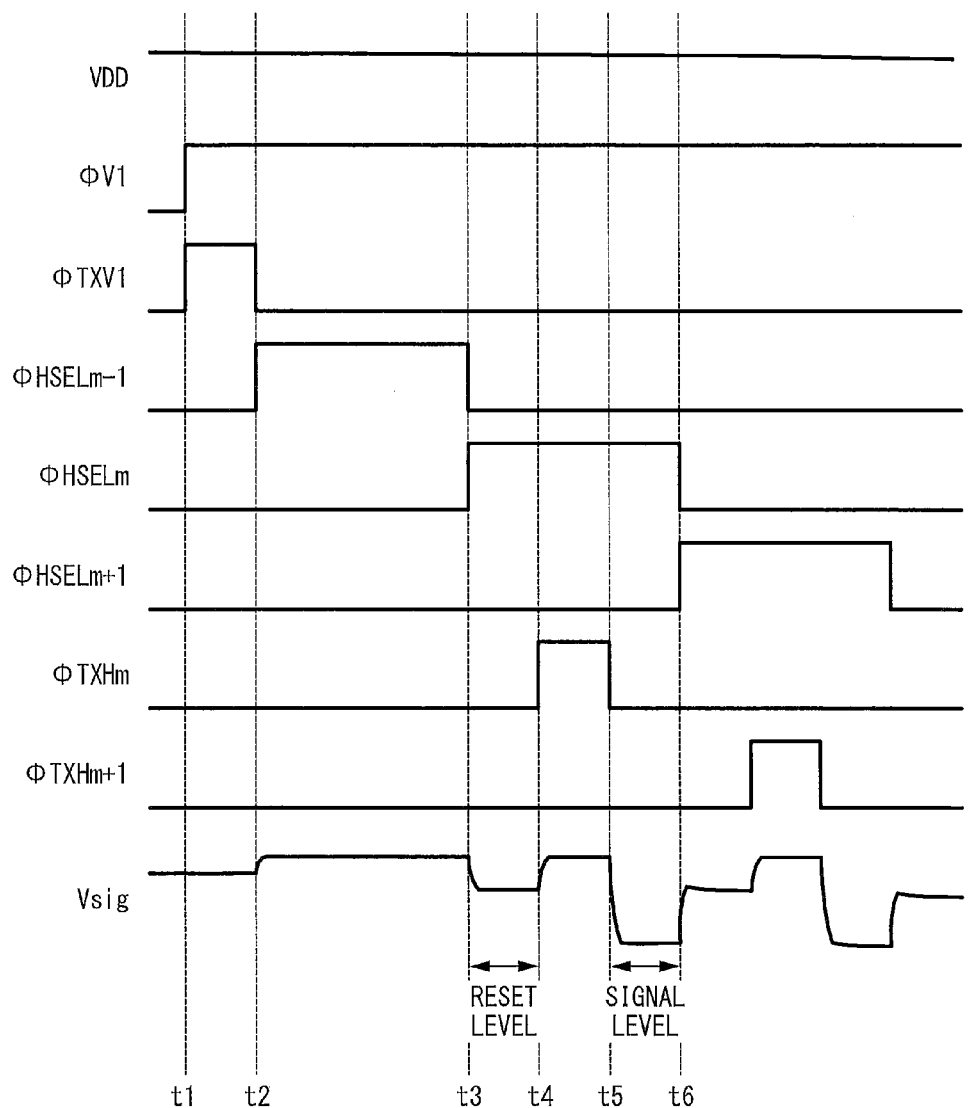
FIG. 3 is a timing chart showing an operation example of the solid-state imaging apparatus according to the first embodiment of the present invention.

Next, an operation of the solid-state imaging apparatus 100A will be described. FIGS. 2 and 3 show an operation example of the solid-state imaging apparatus 100A. In FIGS. 2 and 3, waveforms of the power supply voltage VDD, the output pulse ΦV1, the first transfer pulse ΦTXV1, the selection pulse ΦHSELm−1, the selection pulse ΦHSELm, the selection pulse ΦHSELm+1, the second transfer pulse ΦTXHm, the second transfer pulse ΦTXHm+1, and the signal Vsig output from the I-V conversion section 111 are shown. The horizontal direction of FIGS. 2 and 3 represents time and the vertical direction of FIGS. 2 and 3 represents a voltage.

Figure 17:
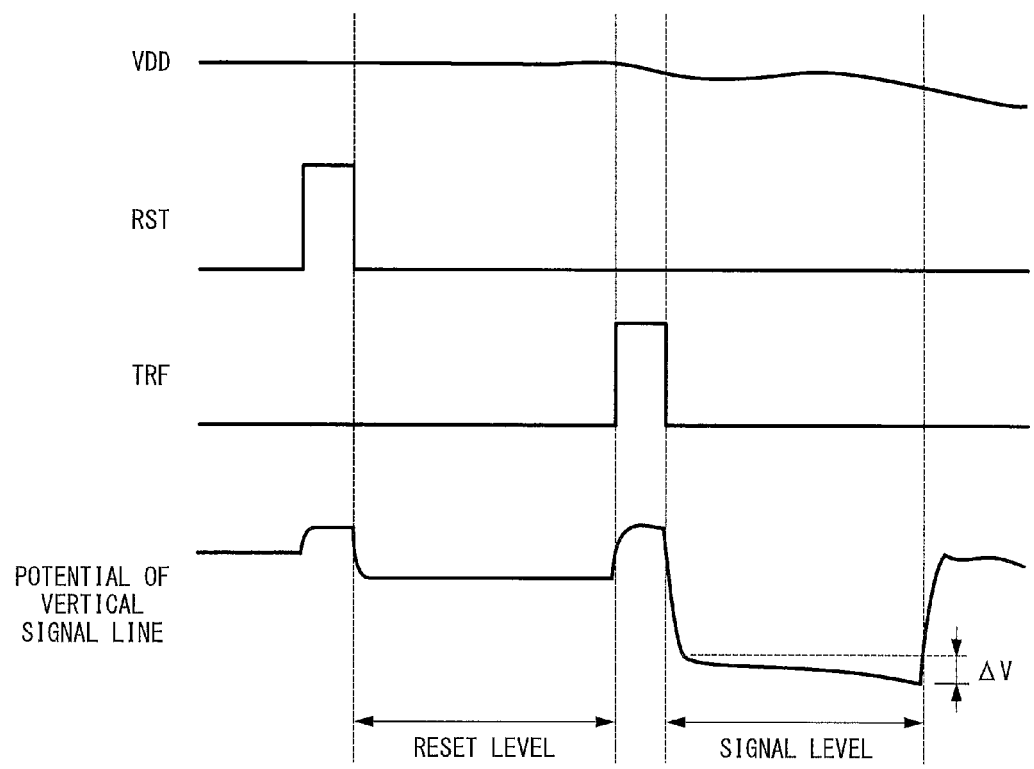
FIG. 17 is a timing chart showing a change in a potential of a vertical signal line in the conventional solid-state imaging apparatus.

The scale of a time direction of FIG. 2 is the same as the scale of the time direction of FIG. 17. FIG. 3 is a diagram obtained by enlarging a portion of a dashed line DT of FIG. 2. Hereinafter, the operation of the solid-state imaging apparatus 100A will be described with reference to FIG. 3.

(Timing t1)

The output pulse ΦV1 changes from the Low level to the High level and therefore the transistor of the first row among the plurality of transistors constituting the output switch 110 is in the ON state. Simultaneously, the first transfer pulse ΦTXV1 changes from the Low level to the High level and therefore all first transfer sections 102 of the first row are in the ON state. Thereby, a signal charge is transferred from all the photoelectric conversion sections 101 of the first row to the first accumulation section 103.

As described above, the first transfer section 102 transfers the signal charge from the photoelectric conversion section 101 to the first accumulation section 103 in a first period from timing t1 to timing t2.

(Timing t2)

The first transfer pulse ΦTXV1 changes from the High level to the Low level and therefore all first transfer sections 102 of the first row are in the OFF state. Simultaneously, the selection pulse ΦHSELm−1 changes from the Low level to the High level and therefore the reset section 106 of the $m^{th}$ column is in the ON state. Thereby, the signal charge accumulated in the second accumulation section 105 of the $m^{th}$ column is reset.

As described above, the reset section 106 resets the signal charge accumulated in the second accumulation section 105 in a second period from timing t2 to timing t3. After the reset section 106 performs the reset operation, the first transfer section 102 may transfer the signal charge.

(Timing t3)

The selection pulse ΦHSELm−1 changes from the High level to the Low level and therefore the reset section 106 of the $m^{th}$ column is in the OFF state. Simultaneously, the selection pulse ΦHSELm changes from the Low level to the High level and therefore the selection section 108 of the $m^{th}$ column is in the ON state. Thereby, the signal of the reset level is output to the output signal line 109 of the first row. A current based on this signal is converted into a voltage by the I-V conversion section 111. The I-V conversion section 111 outputs the signal Vsig corresponding to the reset level in the first row and the $m^{th}$ column. In addition, the reset section 106 of the $(m+1)^{th}$ column is in the ON state and therefore the signal charge accumulated in the second accumulation section 105 of the $(m+1)^{th}$ column is reset.

As described above, the selection section 108 outputs a first signal according to the reset signal charge, that is, a signal of the reset level, in a third period from timing t3 to timing t4.

(Timing t4)

The second transfer pulse ΦTXHm changes from the Low level to the High level and therefore the second transfer section 104 of the $m^{th}$ column is in the ON state. Thereby, a potential of the first accumulation section 103 of the $m^{th}$ column is the same as a potential of the second accumulation section 105 of the $m^{th}$ column. That is, the signal charge accumulated in the first accumulation section 103 is transferred to the second accumulation section 105.

As described above, the second transfer section 104 transfers the signal charge from the first accumulation section 103 to the second accumulation section 105 in a fourth period from timing t4 to timing t5.

(Timing t5)

The second transfer pulse ΦTXHm changes from the High level to the Low level and therefore the second transfer section 104 of the $m^{th}$ column is in the OFF state. Thereby, the signal of the signal level is output to the output signal line 109 of the first row. A current based on this signal is converted into a voltage by the I-V conversion section 111. The I-V conversion section 111 outputs the signal Vsig corresponding to the signal level in the first row and the $m^{th}$ column.

As described above, the selection section 108 outputs a second signal according to a signal charge transferred to the second accumulation section 105, that is, a signal of the signal level, in a fifth period from timing t5 to timing t6.

(Timing t6)

The selection pulse ΦHSELm changes from the High level to the Low level and therefore the selection section 108 of the $m^{th}$ column is in the OFF state and the reset section 106 of the $(m+1)^{th}$ column is in the OFF state. Simultaneously, the selection pulse ΦHSELm+1 changes from the Low level to the High level and therefore the selection section 108 of the $(m+1)^{th}$ column is in the ON state. Thereby, the reading of signals of the $m^{th}$ column ends and the reading of signals of the $(m+1)^{th}$ column starts.

The reading of signals of the $(m+1)^{th}$ column is similar to the reading of signals of the $m^{th}$ column. That is, in the $(m+1)^{th}$ column, an operation similar to the operation from timing t3 to timing t6 is performed. Likewise, signals are read column by column. In the operation shown in FIG. 3, the signal charge related to a second column adjacent to a first column is reset at timing t3 simultaneously when the first signal of the reset level related to the first column of the array of the plurality of photoelectric conversion sections 101 is output at timing t3, and subsequently the first signal and the second signal related to the second column are output after the second signal of the signal level related to the first column is output at timing t5.

After signals are read from all columns of the first row, signals are read from columns of the second row. Thereafter, an operation similar to the above is performed for every row of the array of the plurality of photoelectric conversion sections 101.

Among components of the solid-state imaging apparatus 100A, the output switch 110 and the I-V conversion section 111 are not essential components for achieving the characteristic effects of the solid-state imaging apparatus 100A.

According to this embodiment, the solid-state imaging apparatus 100A includes: the plurality of photoelectric conversion sections 101 configured to generate a signal charge according to an amount of an incident light and disposed in a matrix; the first accumulation section 103 configured to accumulate the signal charge; the first transfer section 102 configured to transfer the signal charge from the photoelectric conversion sections 101 to the first accumulation section 103; the second accumulation section 105 configured to accumulate the signal charge accumulated in the first accumulation section 103; the second transfer section 104 configured to transfer the signal charge accumulated in the first accumulation section 103 to the second accumulation section 105; the reset section 106 configured to reset the signal charge accumulated in the second accumulation section 105; an output section (the amplification section 107 and the selection section 108) configured to output a signal according to the signal charge accumulated in the second accumulation section to the output signal line 109; a first control section (the horizontal selection section 112) configured to control the second transfer section 104, the reset section 106, and the output section for every column of an array of the plurality of photoelectric conversion sections 101; and a second control section (the vertical selection section 113) configured to control the first transfer section 102 for every row, wherein the first transfer section 102 transfers the signal charge in a first period, wherein the reset section 106 resets the signal charge in a second period different from the first period, wherein the output section outputs a first signal according to the reset signal charge in a third period after the second period, wherein the second transfer section 104 transfers the signal charge in a fourth period after the first and the third period, wherein the output section outputs a second signal according to the transferred signal charge in a fifth period after the fourth period, and wherein, after the first signal and the second signal related to a first column of the array are output, the first signal and the second signal related to a second column different from the first column are output.

In this embodiment, it is possible to read the second signal of the signal level immediately after the first signal of the reset level is read from the same column of the array of the plurality of photoelectric conversion sections 101. Thus, it is possible to reduce a difference between the read timing of the first signal and the read timing of the second signal. For example, when an operation frequency is 27 MHz (1 CLK=37 ns), it is possible to set the difference between the read timing of the first signal and the read timing of the second signal to 1 CLK (37 ns) or less. This difference is significantly shorter than a difference (several µs) between read timings of two types of signals in the conventional solid-state imaging apparatus. Accordingly, it is possible to reduce noise due to a change in the low frequency of the power supply voltage VDD.

(Modified Example)

Figure 4:
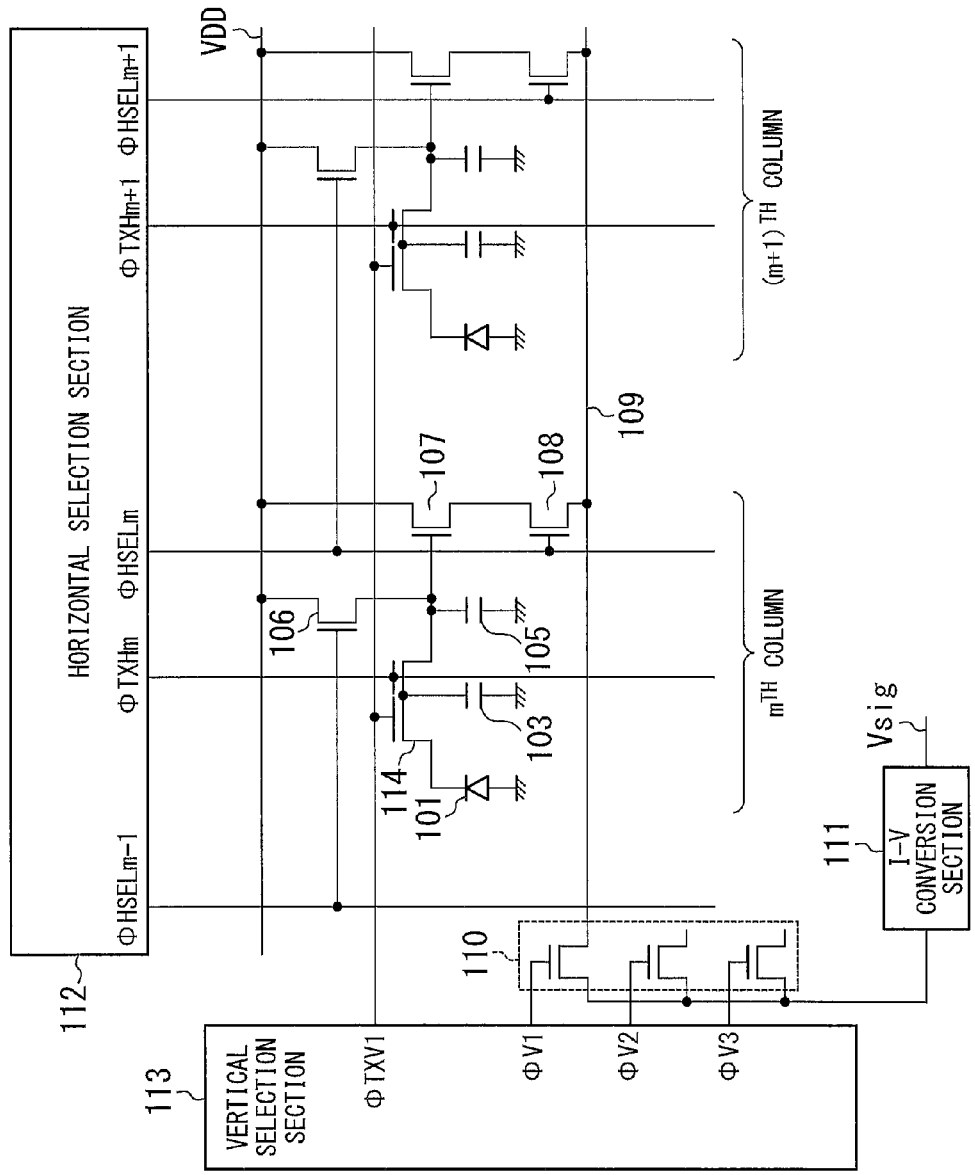
FIG. 4 is a circuit diagram showing a configuration example of a solid-state imaging apparatus according to a modified example of the first embodiment of the present invention.

Next, a modified example of this embodiment will be described. FIG. 4 shows a configuration example of a solid-state imaging apparatus 100B according to this modified example. As shown in FIG. 4, the solid-state imaging apparatus 100B has a photoelectric conversion section 101, a first accumulation section 103, a second accumulation section 105, a reset section 106, an amplification section 107, a selection section 108, an output switch 110, an I-V conversion section 111, a horizontal selection section 112, a vertical selection section 113, and a transfer section 114.

Hereinafter, differences between the solid-state imaging apparatus 100A shown in FIG. 1 and the solid-state imaging apparatus 100B shown in FIG. 4 will be described. In the solid-state imaging apparatus 100B, the first transfer section 102 and the second transfer section 104 are replaced with a transfer section 114. The transfer section 114 has functions of both the first transfer section 102 and the second transfer section 104. The transfer section 114 is configured as a transistor of a double (multi) gate structure (for example, see the publication of Japanese Unexamined Patent Application, First Publication No. 2011-40926).

The transfer section 114 is disposed between the photoelectric conversion section 101 and the second accumulation section 105. The transfer section 114 has two gates. A first transfer pulse $\Phi TXV1$ supplied from the vertical selection section 113 is input to a first gate of the transfer section 114. In addition, a second transfer pulse $\Phi TXHm$ supplied from the horizontal selection section 112 is input to a second gate of the transfer section 114. The first accumulation section 103 is connected between a region corresponding to the first gate and a region corresponding to the second gate in the transfer section 114.

Components other than those above are similar to those of the solid-state imaging apparatus 100A. An operation of the solid-state imaging apparatus 100B is similar to the operation of the solid-state imaging apparatus 100A.

Even in this modified example, it is possible to read the second signal of the signal level immediately after the first signal of the reset level is read from the same column of the array of the plurality of photoelectric conversion sections 101. Thus, it is possible to reduce noise due to a change in the low frequency of the power supply voltage VDD.

(Second Embodiment)

Figure 5:
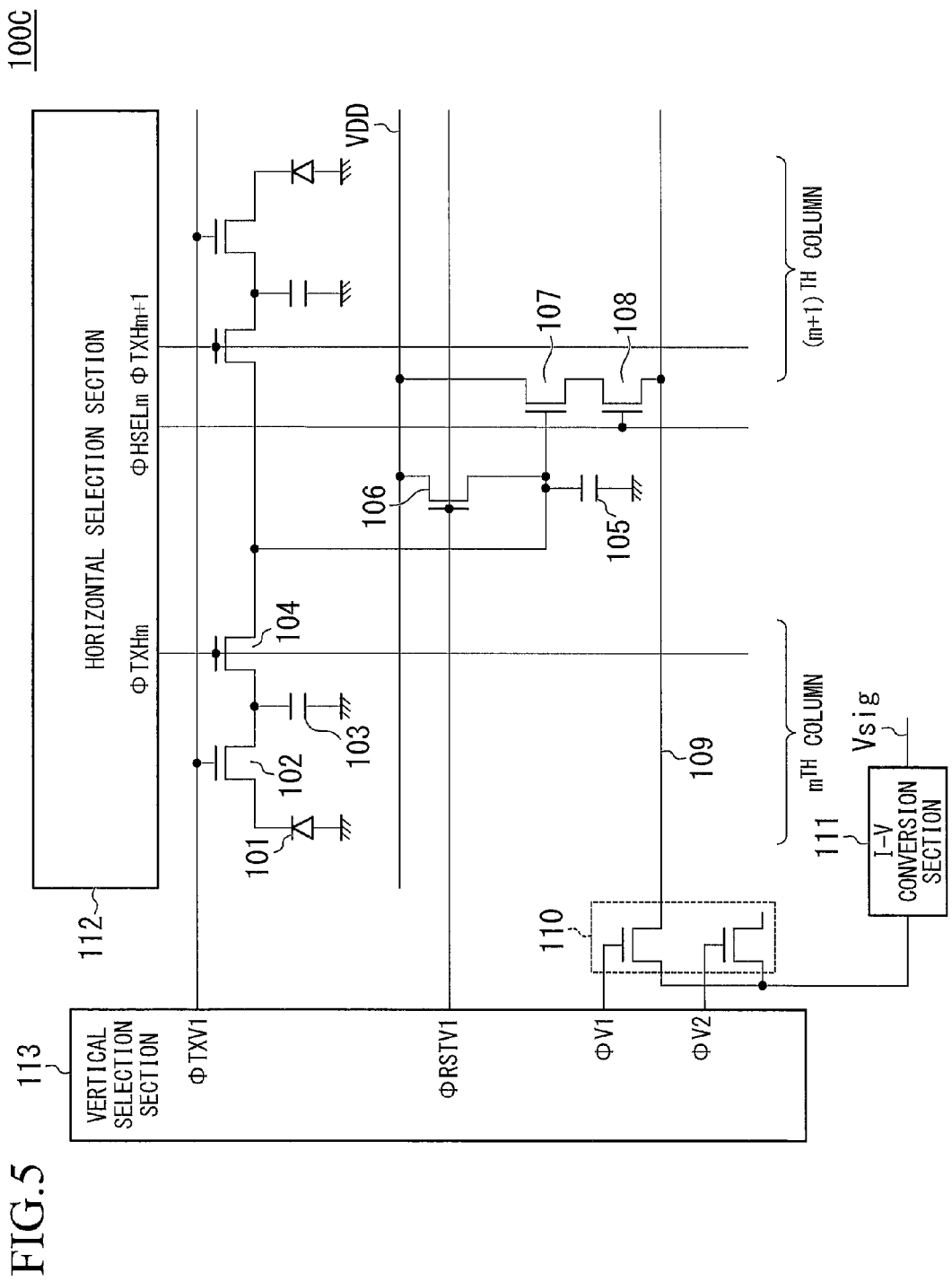
FIG. 5 is a circuit diagram showing a configuration example of a solid-state imaging apparatus according to a second embodiment of the present invention.

Next, the second embodiment of the present invention will be described. FIG. 5 shows a configuration example of a solid-state imaging apparatus 100C according to this embodiment. As shown in FIG. 5, the solid-state imaging apparatus 100C has a photoelectric conversion section 101, a first transfer section 102, a first accumulation section 103, a second transfer section 104, a second accumulation section 105, a reset section 106, an amplification section 107, a selection section 108, an output switch 110, an I-V conversion section 111, a horizontal selection section 112, and a vertical selection section 113.

Hereinafter, differences between the solid-state imaging apparatus 100A shown in FIG. 1 and the solid-state imaging apparatus 100C shown in FIG. 5 will be described. In the solid-state imaging apparatus 100C, the second accumulation section 105 is configured as a capacitor commonly disposed in correspondence with two photoelectric conversion sections 101 adjacent in a row direction (horizontal direction) among a plurality of photoelectric conversion sections 101. In addition, the reset section 106, the amplification section 107, and the selection section 108 are configured as transistors commonly disposed in correspondence with the two photoelectric conversion sections 101 adjacent in the row direction among the plurality of photoelectric conversion sections 101. That is, in the solid-state imaging apparatus 100C, the second accumulation section 105, the reset section 106, the amplification section 107, and the selection section 108 are shared between a pixel of an m$^{th}$ column and a pixel of an (m+1)$^{th}$ column adjacent to the pixel of the m$^{th}$ column in the row direction.

The operation of the reset section 106 is controlled by a reset pulse ΦRSTV as a control signal supplied from the vertical selection section 113 to a gate of the reset section 106, In FIG. 5, the reset pulse ΦRSTV1 supplied to the reset section 106 of the first row is shown. Components other than those above are similar to those of the solid-state imaging apparatus 100A.

Figure 6:
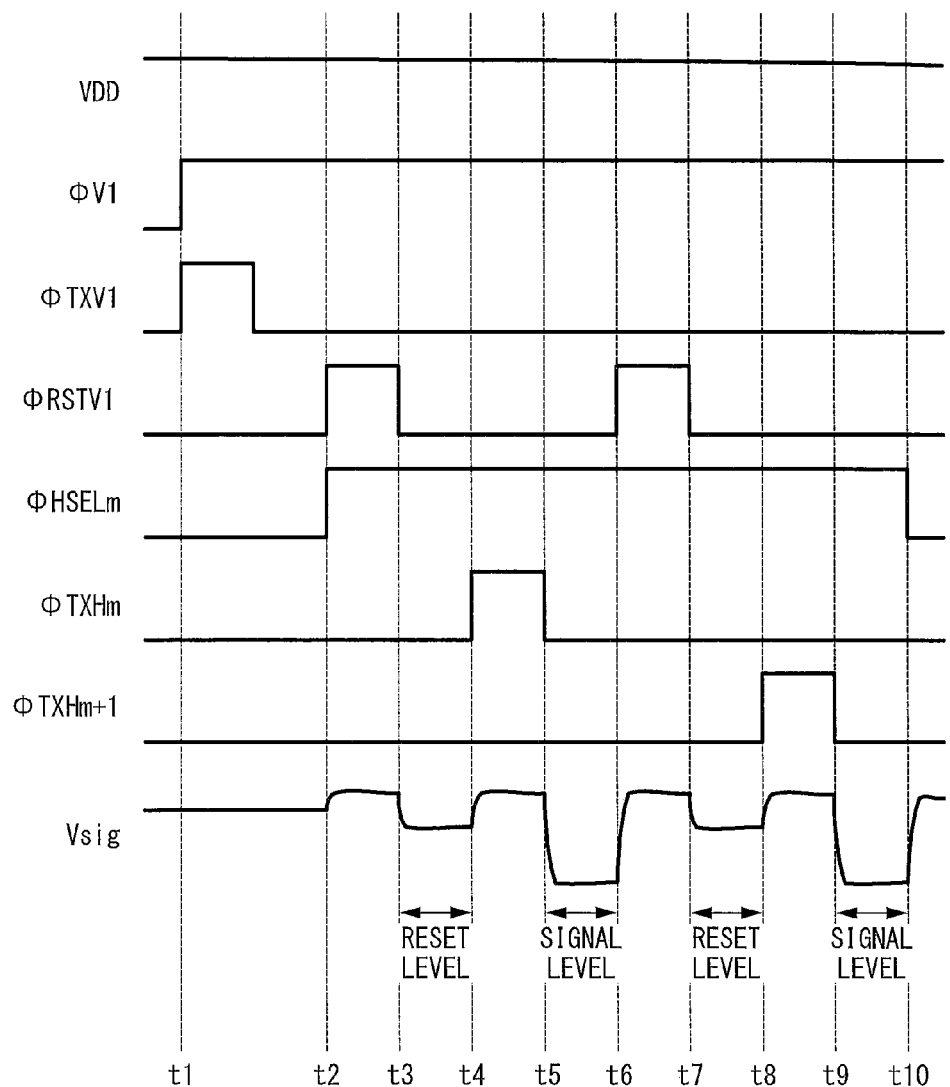
FIG. 6 is a timing chart showing a first operation example of the solid-state imaging apparatus according to the second embodiment of the present invention.

Next, an operation of the solid-state imaging apparatus 100C will be described. FIG. 6 shows a first operation example of the solid-state imaging apparatus 100C. In FIG. 6, waveforms of the power supply voltage VDD, the output pulse ΦV1, the first transfer pulse ΦTXV1, the reset pulse ΦRSTV1, the selection pulse ΦHSELm, the second transfer pulse ΦTXHm, the second transfer pulse ΦTXHm+1, and the signal Vsig output from the I-V conversion section 111 are shown. The horizontal direction of FIG. 6 represents time and the vertical direction of FIG. 6 represents a voltage.

(Timing t1)

The output pulse ΦV1 changes from the Low level to the High level and therefore the transistor of the first row among a plurality of transistors constituting the output switch 110 is in the ON state. Simultaneously, the first transfer pulse ΦTXV1 changes from the Low level to the High level and therefore all the first transfer sections 102 of the first row are in the ON state. Thereby, a signal charge is transferred from all the photoelectric conversion sections 101 of the first row to the first accumulation section 103.

Thereafter, the first transfer pulse ΦTXV1 changes from the High level to the Low level at a timing between timing t1 and timing t2 and therefore all the first transfer sections 102 of the first row are in the OFF state.

As described above, the first transfer section 102 transfers the signal charge from the photoelectric conversion section 101 to the first accumulation section 103 in a first period from timing t1 to timing t2.

(Timing t2)

The reset pulse ΦRSTV1 changes from the Low level to the High level and therefore all reset sections 106 of the first row are in the ON state. Thereby, a signal charge accumulated in all second accumulation sections 105 of the first row is reset. Simultaneously, the selection pulse ΦHSELm changes from the Low level to the High level and therefore the selection section 108 corresponding to the m$^{th}$ and (m+1)$^{th}$ columns is in the ON state.

As described above, the reset section 106 resets the signal charge accumulated in the second accumulation section 105 in a second period from timing t2 to timing t3. After the reset section 106 performs the reset operation, the first transfer section 102 may transfer the signal charge.

(Timing t3)

The reset pulse ΦRSTV1 changes from the High level to the Low level and therefore all the reset sections 106 of the first row are in the OFF state. Because the selection section 108 corresponding to the m$^{th}$ and (m+1)$^{th}$ columns is in the ON state, the signal of the reset level is output to the output signal line 109 of the first row. A current based on this signal is converted into a voltage by the I-V conversion section 111. The I-V conversion section 111 outputs the signal Vsig corresponding to the reset level in the first row and the m$^{th}$ column.

As described above, the selection section 108 outputs a first signal according to the reset signal charge, that is, a signal of the reset level, in a third period from timing t3 to timing t4.

(Timing t4)

The second transfer pulse ΦTXHm changes from the Low level to the High level and therefore the second transfer section 104 of the m$^{th}$ column is in the ON state. Thereby, a potential of the first accumulation section 103 of the m$^{th}$ column is the same as a potential of the second accumulation section 105 corresponding to the m$^{th}$ and (m+1)$^{th}$ columns. That is, the signal charge accumulated in the first accumulation section 103 is transferred to the second accumulation section 105.

As described above, the second transfer section 104 transfers the signal charge from the first accumulation section 103 to the second accumulation section 105 in a fourth period from timing t4 to timing t5.

(Timing t5)

The second transfer pulse ΦTXHm changes from the High level to the Low level and therefore the second transfer section 104 of the m$^{th}$ column is in the OFF state. Thereby, the signal of the signal level is output to the output signal line 109 of the first row. A current based on this signal is converted into a voltage by the I-V conversion section 111. The I-V conversion section 111 outputs the signal Vsig corresponding to the signal level in the first row and the m$^{th}$ column.

As described above, the selection section 108 outputs a second signal corresponding to a signal charge transferred to the second accumulation section 105, that is, a signal of the signal level, in a fifth period from timing t5 to timing t6.

(Timing t6)

The reset pulse ΦRSTV1 changes from the Low level to the High level and therefore all the reset sections 106 of the first row are in the ON state. Thereby, the signal charge accumulated in all the second accumulation sections 105 of the first row is reset. This operation is similar to an operation in the second period from timing t2 to timing t3.

(Timing t7)

The reset pulse ΦRSTV1 changes from the High level to the Low level and therefore all the reset sections 106 of the first row are in the OFF state. Because the selection section 108 corresponding to the m$^{th}$ and (m+1)$^{th}$ columns is in the ON state, the signal of the reset level is output to the output signal line 109 of the first row. A current based on this signal is converted into a voltage by the I-V conversion section 111. The I-V conversion section 111 outputs the signal Vsig corresponding to the reset level in the first row and the (m+1)$^{th}$ column. This operation is similar to an operation in the third period from timing t3 to timing t4.

(Timing t8)

The second transfer pulse ΦTXHm+1 changes from the Low level to the High level and therefore the second transfer section 104 of the (m+1)$^{th}$ column is in the ON state. Thereby, a potential of the first accumulation section 103 of the (m+1)$^{th}$ column is the same as a potential of the second accumulation section 105 corresponding to the m$^{th}$ and (m+1)$^{th}$ columns. That is, the signal charge accumulated in the first accumulation section 103 is transferred to the second accumulation section 105. This operation is similar to an operation in the fourth period from timing t4 to timing t5.

(Timing t9)

The second transfer pulse ΦTXHm+1 changes from the High level to the Low level and therefore the second transfer section 104 of the (m+1)$^{th}$ column is in the OFF state. Thereby, the signal of the signal level is output to the output signal line 109 of the first row. A current based on this signal is converted into a voltage by the I-V conversion section 111. The I-V conversion section 111 outputs the signal Vsig corresponding to the signal level in the first row and the $(m+1)^{th}$ column. This operation is similar to an operation in the fifth period from timing t5 to timing t6.

(Timing t10)

The selection pulse ΦHSELm changes from the High level to the Low level and therefore the selection section 108 corresponding to the $m^{th}$ and $(m+1)^{th}$ columns is in the OFF state. Thereby, the reading of signals of the $m^{th}$ and $(m+1)^{th}$ columns ends.

Subsequently, signals of the $(m+2)^{th}$ and $(m+3)^{th}$ columns are read. The reading of the signals of the $(m+2)^{th}$ and $(m+3)^{th}$ columns is similar to the reading of the signals of the $m^{th}$ and $(m+1)^{th}$ columns. That is, for the $(m+2)^{th}$ and $(m+3)^{th}$ columns, an operation similar to the operation from timing t2 to timing t10 is performed. Likewise, signals are read column by column. In the operation shown in FIG. 6, the first signal and the second signal related to the second column adjacent to the first column are output after the first signal and the second signal related to the first column of the array of the plurality of photoelectric conversion sections 101 are output.

After signals are read from all columns of the first row, signals are read from columns of the second row. Thereafter, an operation similar to the above is performed for every row of the array of the plurality of photoelectric conversion sections 101.

Figure 7:
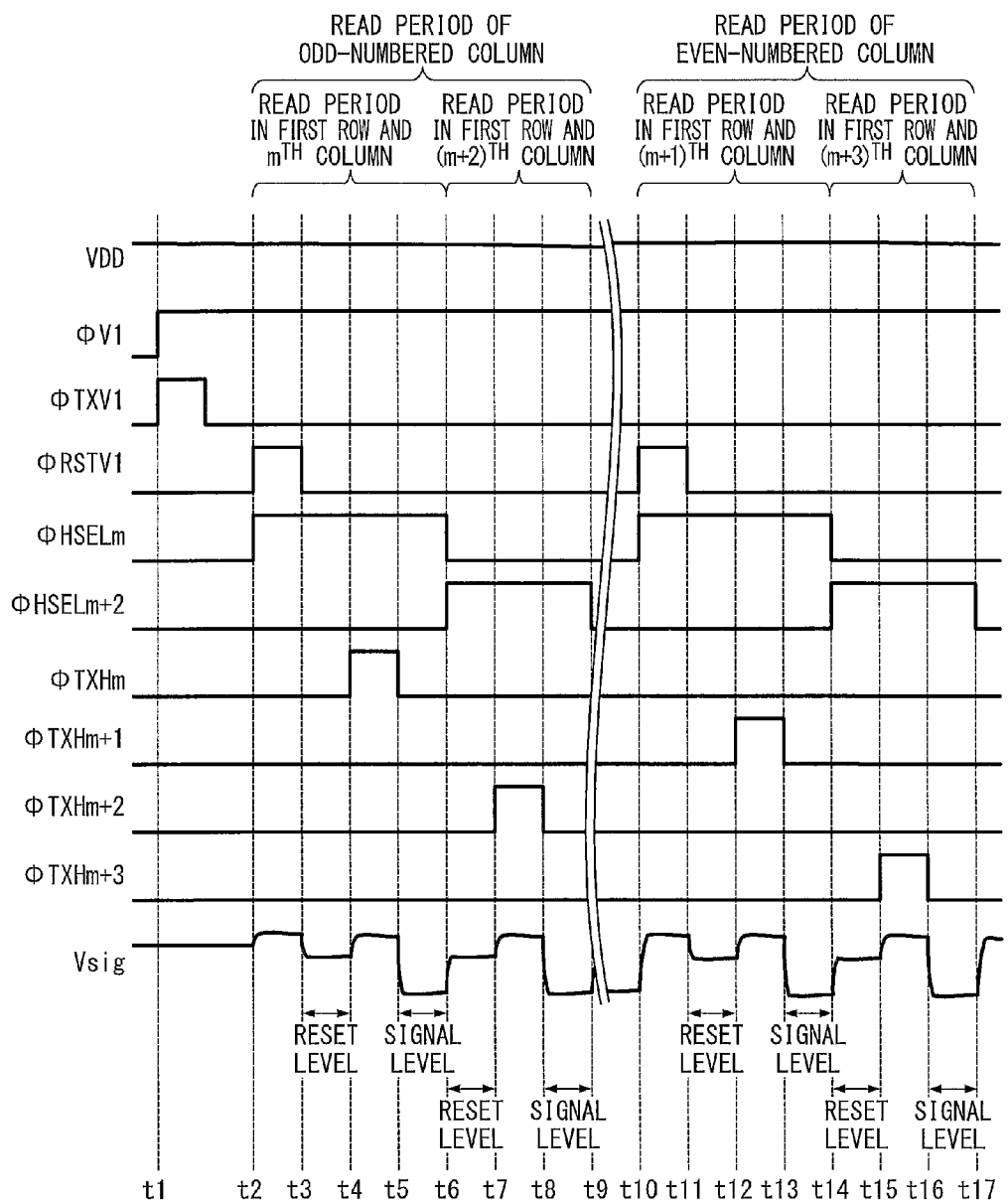
FIG. 7 is a timing chart showing a second operation example of the solid-state imaging apparatus according to the second embodiment of the present invention.

FIG. 7 shows a second operation example of the solid-state imaging apparatus 100C. In FIG. 7, waveforms of the power supply voltage VDD, the output pulse ΦV1, the first transfer pulse ΦTXV1, the reset pulse ΦRSTV1, the selection pulse ΦHSELm, the selection pulse ΦHSELm+2, the second transfer pulse ΦTXHm, the second transfer pulse ΦTXHm+1, the second transfer pulse ΦTXHm+2, the second transfer pulse ΦTXHm+3, and the signal Vsig output from the I-V conversion section 111 are shown. The horizontal direction of FIG. 7 represents time and the vertical direction of FIG. 7 represents a voltage.

Hereinafter, an operation when m is an odd number and m+1 is an even number will be described. An operation from timing t1 to timing t5 is similar to an operation from timing t1 to timing t5 in FIG. 6. Thus, the description of the operation from timing t1 to timing t5 will be omitted. In a period from timing t1 to timing t5, the first signal of the reset level and the second signal of the signal level in the first row and the $m^{th}$ column are read.

(Timing t6)

The selection pulse ΦHSELm+2 changes from the Low level to the High level and therefore the selection section 108 corresponding to the $(m+2)^{th}$ $(m+3)^{th}$ columns is in the ON state. Because the reset operation is performed at timing t1, a signal of the reset level is output to the output signal line 109 of the first row. A current based on this signal is converted into a voltage by the I-V conversion section 111. The I-V conversion section 111 outputs the signal Vsig corresponding to the reset level in the first row and the $(m+2)^{th}$ column.

(Timing t7)

The second transfer pulse ΦTXHm+2 changes from the Low level to the High level and therefore the second transfer section 104 of the $(m+2)^{th}$ column is in the ON state. Thereby, a potential of the first accumulation section 103 of the $(m+2)^{th}$ column is the same as a potential of the second accumulation section 105 corresponding to the $(m+2)^{th}$ and $(m+3)^{th}$ columns. That is, the signal charge accumulated in the first accumulation section 103 is transferred to the second accumulation section 105.

(Timing t8)

The second transfer pulse ΦTXHm+2 changes from the High level to the Low level and therefore the second transfer section 104 of the $(m+2)^{th}$ column is in the OFF state. Thereby, the signal of the signal level is output to the output signal line 109 of the first row. A current based on this signal is converted into a voltage by the I-V conversion section 111. The I-V conversion section 111 outputs the signal Vsig corresponding to the signal level in the first row and the $(m+2)^{th}$ column.

(Timing t9)

The selection pulse ΦHSELm+2 changes from the High level to the Low level and therefore the selection section 108 corresponding to the $(m+2)^{th}$ and $(m+3)^{th}$ columns is in the OFF state. Thereby, the reading of signals of the $(m+2)^{th}$ column ends.

As described above, the first signal of the reset level and the second signal of the signal level in the first row and the $(m+2)^{th}$ column are read in a period from timing t6 to timing t9. That is, after a signal charge related to the first column which is one of an even-numbered column and an odd-numbered column and a signal charge related to the second column which is the other of the even-numbered column and the odd-numbered column are simultaneously reset in the operation shown in FIG. 7, the first signal of the reset level and the second signal of the signal level related to the first column are output and subsequently the first signal and the second signal related to the second column are output.

Thereafter, signals of the $(m+4)^{th}$ and $(m+6)^{th}$ columns are read. The reading of the signals of the $(m+4)^{th}$ and $(m+6)^{th}$ columns is similar to the reading of the signals of the $m^{th}$ and $(m+2)^{th}$ columns. That is, for the $(m+4)^{th}$ and $(m+6)^{th}$ columns, an operation similar to the operation from timing t2 to timing t9 is performed. Likewise, signals are read column by column for odd-numbered columns.

(Timing t10)

The reset pulse ΦRSTV1 changes from the Low level to the High level and therefore all the reset sections 106 of the first row are in the ON state. Thereby, a signal charge accumulated in all second accumulation sections 105 of the first row is reset. Simultaneously, the selection pulse ΦHSELm changes from the Low level to the High level and therefore the selection section 108 corresponding to the $m^{th}$ and $(m+1)^{th}$ columns is in the ON state.

(Timing t11)

The reset pulse ΦRSTV1 changes from the High level to the Low level and therefore all the reset sections 106 of the first row are in the OFF state. Because the selection section 108 corresponding to the $m^{th}$ and $(m+1)^{th}$ columns is in the ON state, the signal of the reset level is output to the output signal line 109 of the first row. A current based on this signal is converted into a voltage by the I-V conversion section 111. The I-V conversion section 111 outputs the signal Vsig corresponding to the reset level in the first row and the $(m+1)^{th}$ column.

(Timing t12)

The second transfer pulse ΦTXHm+1 changes from the Low level to the High level and therefore the second transfer section 104 of the $(m+1)^{th}$ column is in the ON state. Thereby, a potential of the first accumulation section 103 of the $(m+1)^{th}$ column is the same as a potential of the second accumulation section 105 corresponding to the $m^{th}$ and $(m+1)^{th}$ columns. That is, the signal charge accumulated in the first accumulation section 103 is transferred to the second accumulation section 105.

(Timing t13)

The second transfer pulse ΦTXHm+1 changes from the High level to the Low level and therefore the second transfer section 104 of the $(m+1)^{th}$ column is in the OFF state. Thereby, the signal of the signal level is output to the output signal line 109 of the first row. A current based on this signal is converted into a voltage by the I-V conversion section 111. The I-V conversion section 111 outputs the signal Vsig corresponding to the signal level in the first row and the $(m+1)^{th}$ column.

(Timing t14)

The selection pulse ΦHSELm changes from the High level to the Low level and therefore the selection section 108 corresponding to the $m^{th}$ and $(m+1)^{th}$ columns is in the OFF state. Thereby, the reading of signals of the $(m+1)^{th}$ column ends. Simultaneously, the selection pulse ΦHSELm+2 changes from the Low level to the High level and therefore the selection section 108 corresponding to the $(m+2)^{th}$ and $(m+3)^{th}$ columns is in the ON state. Because the reset operation is performed at timing t10, the signal of the reset level is output to the output signal line 109 of the first row. A current based on this signal is converted into a voltage by the I-V conversion section 111. The I-V conversion section 111 outputs the signal Vsig corresponding to the reset level in the first row and the $(m+3)^{th}$ column.

(Timing t15)

The second transfer pulse ΦTXHm+3 changes from the Low level to the High level and therefore the second transfer section 104 of the $(m+3)^{th}$ column is in the ON state. Thereby, a potential of the first accumulation section 103 of the $(m+3)^{th}$ column is the same as a potential of the second accumulation section 105 corresponding to the $(m+2)^{th}$ and $(m+3)^{th}$ columns. That is, the signal charge accumulated in the first accumulation section 103 is transferred to the second accumulation section 105.

(Timing t16)

The second transfer pulse ΦTXHm+3 changes from the High level to the Low level and therefore the second transfer section 104 of the $(m+3)^{th}$ column is in the OFF state. Thereby, the signal of the signal level is output to the output signal line 109 of the first row. A current based on this signal is converted into a voltage by the I-V conversion section 111. The I-V conversion section 111 outputs the signal Vsig corresponding to the signal level in the first row and the $(m+3)^{th}$ column.

(Timing t17)

The selection pulse ΦHSELm+2 changes from the High level to the Low level and therefore the selection section 108 corresponding to the $(m+2)^{th}$ and $(m+3)^{th}$ columns is in the OFF state. Thereby, the reading of signals of the $(m+3)^{th}$ column ends.

As described above, the first signal of the reset level and the second signal of the signal level in the first row and the $(m+1)^{th}$ column are read in a period from timing t10 to timing t14. In addition, the first signal of the reset level and the second signal of the signal level in the first row and the $(m+3)^{th}$ column are read in a period from timing t14 to timing t17.

Thereafter, signals of the $(m+5)^{th}$ and $(m+7)^{th}$ columns are read. The reading of the signals of the $(m+5)^{th}$ and $(m+7)^{th}$ columns is similar to the reading of the signals of the $(m+1)^{th}$ and $(m+3)^{th}$ columns. That is, for the $(m+5)^{th}$ and $(m+7)^{th}$ columns, an operation similar to the operation from timing t10 to timing t17 is performed.

Likewise, signals are read column by column for even-numbered columns.

After signals are read from all columns of the first row, signals are read from columns of the second row. Thereafter, an operation similar to the above is performed for every row of the array of the plurality of photoelectric conversion sections 101.

After the first signal of the reset level and the second signal of the signal level of the even-numbered column of one row are read in the second operation example shown in FIG. 7 as described above, the first and second signals of the odd-numbered column of the same row are read. After the first and second signals of the odd-numbered column of one row are read, the first and second signals of the even-numbered column of the same row may be read.

Among components of the solid-state imaging apparatus 100C, the output switch 110 and the I-V conversion section 111 are not essential components for achieving the characteristic effects of the solid-state imaging apparatus 100C.

In this embodiment, it is possible to read the second signal of the signal level immediately after the first signal of the reset level is read from the same column of the array of the plurality of photoelectric conversion sections 101. Thus, it is possible to reduce noise due to a change in the low frequency of the power supply voltage VDD. In addition, because some components are shared by two pixels adjacent in the row direction, it is possible to reduce a circuit area.

In the first operation example shown in FIG. 6, signals are continuously read in two columns sharing the second accumulation section 105. Thus, after a signal of a signal level of the $m^{th}$ column at timing t5 of FIG. 6, it is necessary to perform a reset operation of reading a signal of a reset level of the $(m+1)^{th}$ column.

For this, signals are continuously read in columns between which the second accumulation section 105 is not shared after a reset operation is performed in all columns of the same row in a second operation example shown in FIG. 7. Thus, after a signal of a signal level of the $m^{th}$ column is read at timing t5 of FIG. 7, it is possible to read a signal of a reset level of an $(m+2)^{th}$ column without performing a reset operation. Accordingly, in the second operation example shown in FIG. 7, it is possible to read signals at a speed higher than that in the first operation example shown in FIG. 6.

(Third Embodiment)

Figure 8:
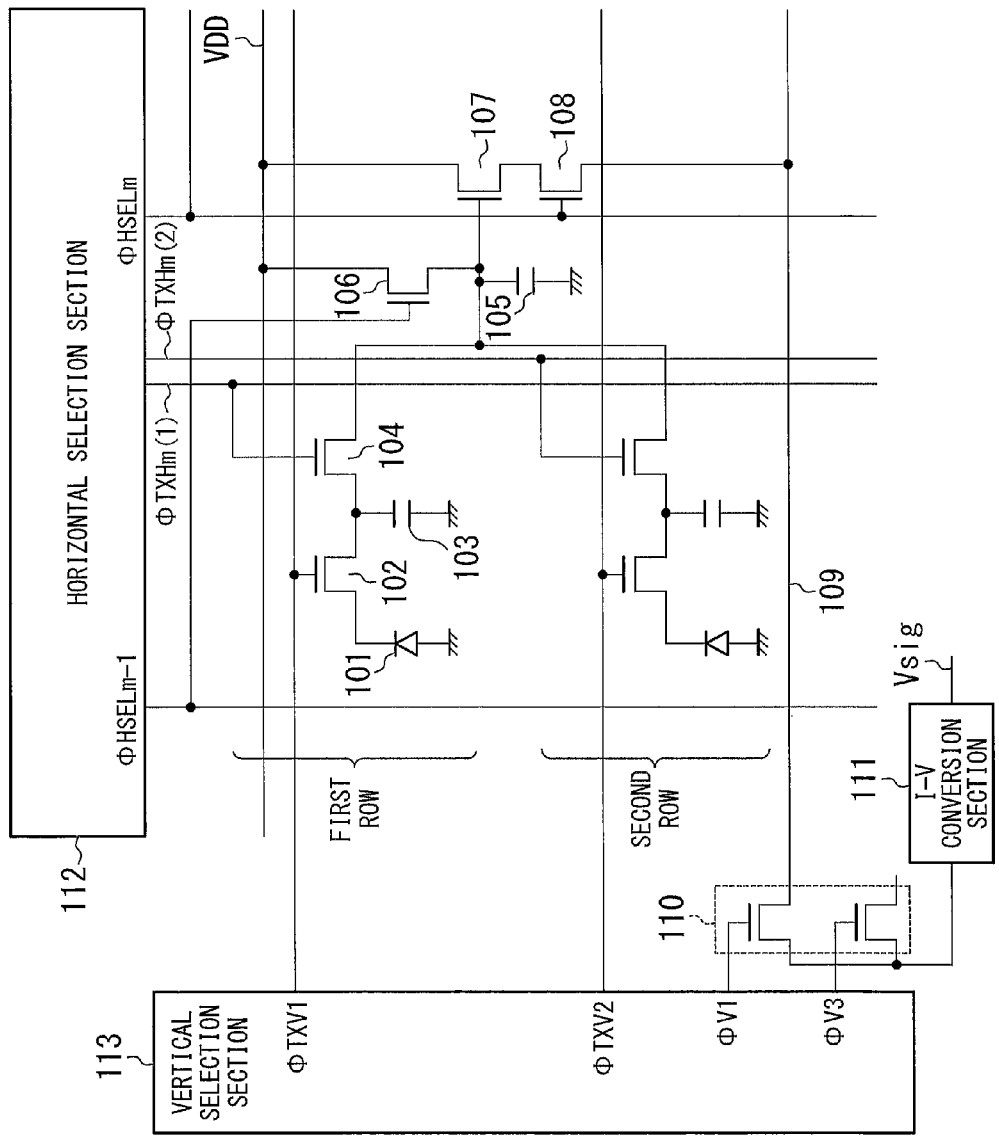
FIG. 8 is a circuit diagram showing a configuration example of a solid-state imaging apparatus according to a third embodiment of the present invention.

Next, the third embodiment of the present invention will be described. FIG. 8 shows a configuration example of a solid-state imaging apparatus 100D according to this embodiment. As shown in FIG. 8, the solid-state imaging apparatus 100D has a photoelectric conversion section 101, a first transfer section 102, a first accumulation section 103, a second transfer section 104, a second accumulation section 105, a reset section 106, an amplification section 107, a selection section 108, an output switch 110, an I-V conversion section 111, a horizontal selection section 112, and a vertical selection section 113.

Hereinafter, differences between the solid-state imaging apparatus 100A shown in FIG. 1 and the solid-state imaging apparatus 100D shown in FIG. 8 will be described. In the solid-state imaging apparatus 100D, the second accumulation section 105 is configured as a capacitor commonly disposed in correspondence with two photoelectric conversion sections 101 adjacent in a column direction (vertical direction) among the plurality of photoelectric conversion sections 101. In addition, the reset section 106, the amplification section 107, and the selection section 108 are configured as transistors commonly disposed in correspondence with the two photoelectric conversion sections 101 adjacent in the column direction among the plurality of photoelectric conversion sections 101. That is, in the solid-state imaging apparatus 100D, the second accumulation section 105, the reset section 106, the amplification section 107, and the selection section 108 are shared between a pixel of a first row and a pixel of a second row adjacent to the pixel of the first row in the column direction.

An operation of the second transfer section 104 is controlled by a second transfer pulse ΦTXH as a control signal supplied from the horizontal selection section 112 to the gate of the second transfer section 104. In FIG. 8, a second transfer pulse ΦTXHm(1) to be supplied to the second transfer section 104 in the first row and an $m^{th}$ column and a second transfer pulse ΦTXHm(2) to be supplied to the second transfer section 104 in the second row and the $m^{th}$ column are shown.

The output signal line 109 is disposed for every two rows, that is, in every other row. Components other than those above are similar to those of the solid-state imaging apparatus 100A.

Figure 9:
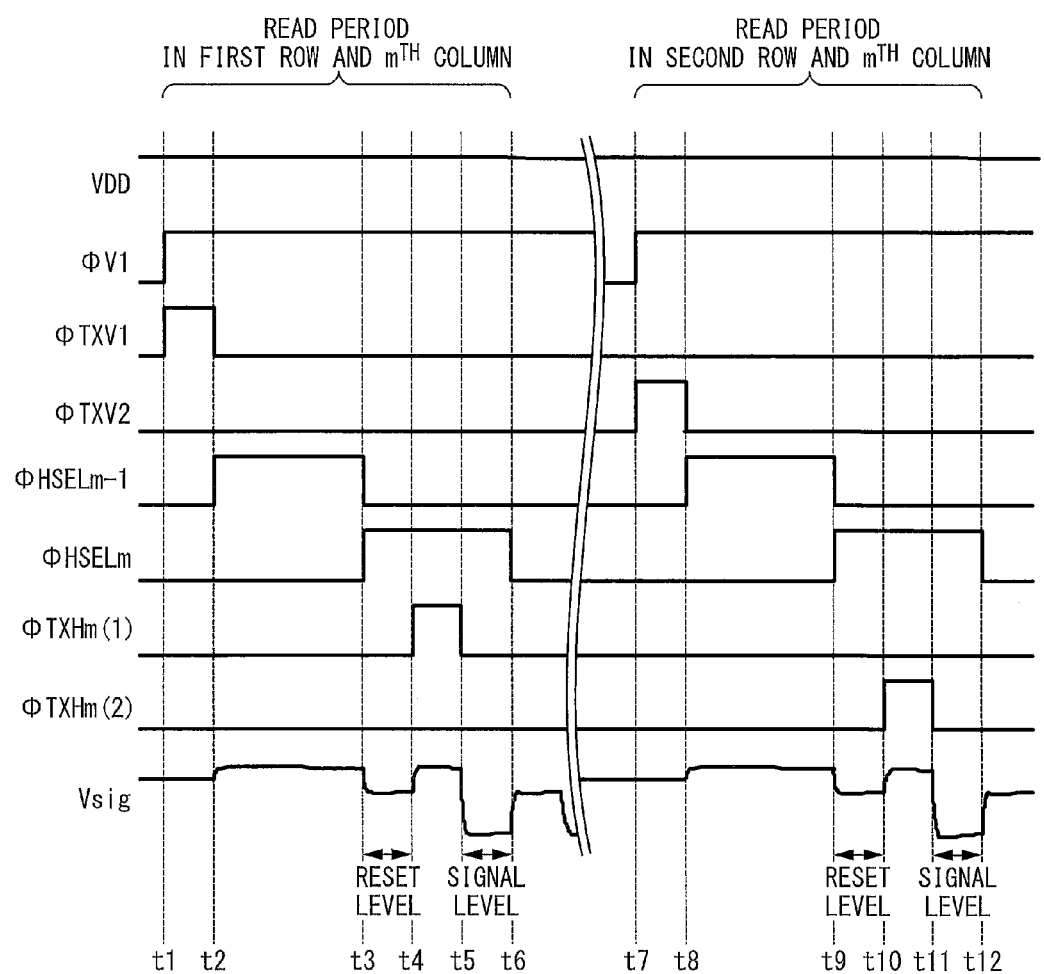
FIG. 9 is a timing chart showing an operation example of the solid-state imaging apparatus according to the third embodiment of the present invention.

Next, an operation of the solid-state imaging apparatus 100D will be described. FIG. 9 shows an operation example of the solid-state imaging apparatus 100D. In FIG. 9, waveforms of the power supply voltage VDD, the output pulse ΦV1, the first transfer pulse ΦTXV1, the first transfer pulse ΦTXV2, the selection pulse ΦHSELm−1, the selection pulse ΦHSELm, the second transfer pulse ΦTXHm(1), the second transfer pulse ΦTXHm(2), and the signal Vsig output from the I-V conversion section 111 are shown. The horizontal direction of FIG. 9 represents time and the vertical direction of FIG. 9 represents a voltage.

(Timing t1)
The output pulse ΦV1 changes from the Low level to the High level and therefore transistors corresponding to the first and second rows among a plurality of transistors constituting the output switch 110 are in the ON state. Simultaneously, the first transfer pulse ΦTXV1 changes from the Low level to the High level and therefore all first transfer sections 102 of the first row are in the ON state. Thereby, a signal charge is transferred from all photoelectric conversion sections 101 of the first row to the first accumulation section 103.

(Timing t2)
The first transfer pulse ΦTXV1 changes from the High level to the Low level and therefore all the first transfer sections 102 of the first row are in the OFF state. Simultaneously, the selection pulse ΦHSELm−1 changes from the Low level to the High level and therefore the reset section 106 of the $m^{th}$ column is in the ON state. Thereby, the signal charge accumulated in the second accumulation section 105 of the $m^{th}$ column is reset.

(Timing t3)
The selection pulse ΦHSELm−1 changes from the High level to the Low level and therefore the reset section 106 of the $m^{th}$ column is in the OFF state. Simultaneously, the selection pulse ΦHSELm changes from the Low level to the High level and therefore the selection section 108 of the $m^{th}$ column is in the ON state. Therefore, the signal of the reset level is output to the output signal line 109 corresponding to the first and second rows. A current based on this signal is converted into a voltage by the I-V conversion section 111. The I-V conversion section 111 outputs the signal Vsig corresponding to the reset level in the first row and the $m^{th}$ column. In addition, the reset section 106 of the $(m+1)^{th}$ column is in the ON state and therefore the signal charge accumulated in the second accumulation section 105 of the $(m+1)^{th}$ column is reset.

(Timing t4)
The second transfer pulse ΦTXHm(1) changes from the Low level to the High level and therefore the second transfer section 104 in the first row and the $m^{th}$ column is in the ON state. Thereby, a potential of the first accumulation section 103 in the first row and the $m^{th}$ column is the same as a potential of the second accumulation section 105 corresponding to the first row and the $m^{th}$ column and the second row and the $m^{th}$ column. That is, the signal charge accumulated in the first accumulation section 103 is transferred to the second accumulation section 105.

(Timing t5)
The second transfer pulse ΦTXHm(1) changes from the High level to the Low level and therefore the second transfer section 104 in the first row and the $m^{th}$ column is in the OFF state. Thereby, the signal of the signal level is output to the output signal line 109 corresponding to the first and second rows. A current based on this signal is converted into a voltage by the I-V conversion section 111. The I-V conversion section 111 outputs the signal Vsig corresponding to the signal level in the first row and the $m^{th}$ column.

(Timing t6)
The selection pulse ΦHSELm changes from the High level to the Low level and therefore the selection section 108 of the $m^{th}$ column is in the OFF state and the reset section 106 of the $(m+1)^{th}$ column is in the OFF state. Thereby, the reading of signals of the $m^{th}$ column ends.

Subsequently, signals of the $(m+1)^{th}$ column are read. The reading of signals of the $(m+1)^{th}$ column is similar to the reading of signals of the $m^{th}$ column. That is, in the $(m+1)^{th}$ column, an operation similar to the operation from timing t2 to timing t6 is performed. Likewise, signals are read column by column. In the operation shown in FIG. 9, the signal charge related to a second column adjacent to a first column is reset at timing t3 simultaneously when the first signal of the reset level related to the first column of the array of the plurality of photoelectric conversion sections 101 is output at timing t3, and subsequently, the first signal and the second signal related to the second column are output after the second signal of the signal level related to the first column is output at timing t5.

After signals are read from all columns of the first row, the output pulse ΦV1 changes from the High level to the Low level and therefore transistors corresponding to the first and second rows among a plurality of transistors constituting the output switch 110 are in the OFF state.

(Timing t7)
The output pulse ΦV1 changes from the Low level to the High level and therefore the transistors corresponding to the first and second rows among a plurality of transistors constituting the output switch 110 are in the ON state. Simultaneously, the first transfer pulse ΦTXV2 changes from the Low level to the High level and therefore all the first transfer sections 102 of the second row are in the ON state. Thereby, a signal charge is transferred from all the photoelectric conversion sections 101 of the second row to the first accumulation section 103.

(Timing t8)
The first transfer pulse ΦTXV2 changes from the High level to the Low level and therefore all the first transfer sections 102 of the second row are in the OFF state. Simultaneously, the selection pulse ΦHSELm−1 changes from the Low level to the High level and therefore the reset section 106 of the $m^{th}$ column is in the ON state. Thereby, the signal charge accumulated in the second accumulation section 105 of the $m^{th}$ column is reset.

(Timing t9)

The selection pulse ΦHSELm−1 changes from the High level to the Low level and therefore the reset section 106 of the m$^{th}$ column is in the OFF state. Simultaneously, the selection pulse ΦHSELm changes from the Low level to the High level and therefore the selection section 108 of the m$^{th}$ column is in the ON state. Therefore, the signal of the reset level is output to the output signal line 109 corresponding to the first and second rows. A current based on this signal is converted into a voltage by the I-V conversion section 111. The I-V conversion section 111 outputs the signal Vsig corresponding to the reset level in the second row and the m$^{th}$ column. In addition, the reset section 106 of the (m+1)$^{th}$ column is in the ON state and therefore the signal charge accumulated in the second accumulation section 105 of the (m+1)$^{th}$ column is reset.

(Timing t10)

The second transfer pulse ΦTXHm(2) changes from the Low level to the High level and therefore the second transfer section 104 in the second row and the m$^{th}$ column is in the ON state. Thereby, a potential of the first accumulation section 103 in the second row and the m$^{th}$ column is the same as a potential of the second accumulation section 105 corresponding to the first row and the m$^{th}$ column and the second row and the m$^{th}$ column. That is, the signal charge accumulated in the first accumulation section 103 is transferred to the second accumulation section 105.

(Timing t11)

The second transfer pulse ΦTXHm(2) changes from the High level to the Low level and therefore the second transfer section 104 in the second row and the m$^{th}$ column is in the OFF state. Thereby, the signal of the signal level is output to the output signal line 109 corresponding to the first and second rows. A current based on this signal is converted into a voltage by the I-V conversion section 111. The I-V conversion section 111 outputs the signal Vsig corresponding to the signal level in the second row and the m$^{th}$ column.

(Timing t12)

The selection pulse ΦHSELm changes from the High level to the Low level and therefore the selection section 108 of the m$^{th}$ column is in the OFF state and the reset section 106 of the (m+1)$^{th}$ column is in the OFF state. Thereby, the reading of signals of the m$^{th}$ column ends.

Subsequently, signals of the (m+1)$^{th}$ column are read. The reading of signals of the (m+1)$^{th}$ column is similar to the reading of signals of the m$^{th}$ column. That is, in the (m+1)$^{th}$ column, an operation similar to the operation from timing t9 to timing t12 is performed. Likewise, signals are read column by column.

After signals are read from all columns of the second row, signals are read from columns of the third row. Thereafter, an operation similar to the above is performed for every row of the array of the plurality of photoelectric conversion sections 101.

Among components of the solid-state imaging apparatus 100D, the output switch 110 and the I-V conversion section 111 are not essential components for achieving the characteristic effects of the solid-state imaging apparatus 100D.

In this embodiment, it is possible to read the second signal of the signal level immediately after the first signal of the reset level is read from the same column of the array of the plurality of photoelectric conversion sections 101. Thus, it is possible to reduce noise due to a change in the low frequency of the power supply voltage VDD. In addition, because some components are shared by two pixels adjacent in the column direction, it is possible to reduce a circuit area.

In the operation shown in FIG. 9, the signal charge related to the second column adjacent to the first column is reset simultaneously when the first signal related to the first column of the array of the plurality of photoelectric conversion sections 101 is output. Thus, it is possible to read signals at a speed higher than that in the operation shown in FIG. 6.

In addition, in the operation shown in FIG. 9, the control of the column is simplified as compared with the operation shown in FIG. 7. Thus, it is possible to simplify a circuit configuration of the horizontal selection section 112 as compared with the solid-state imaging apparatus 100C which performs the operation shown in FIG. 7.

(Fourth Embodiment)

Figure 10:
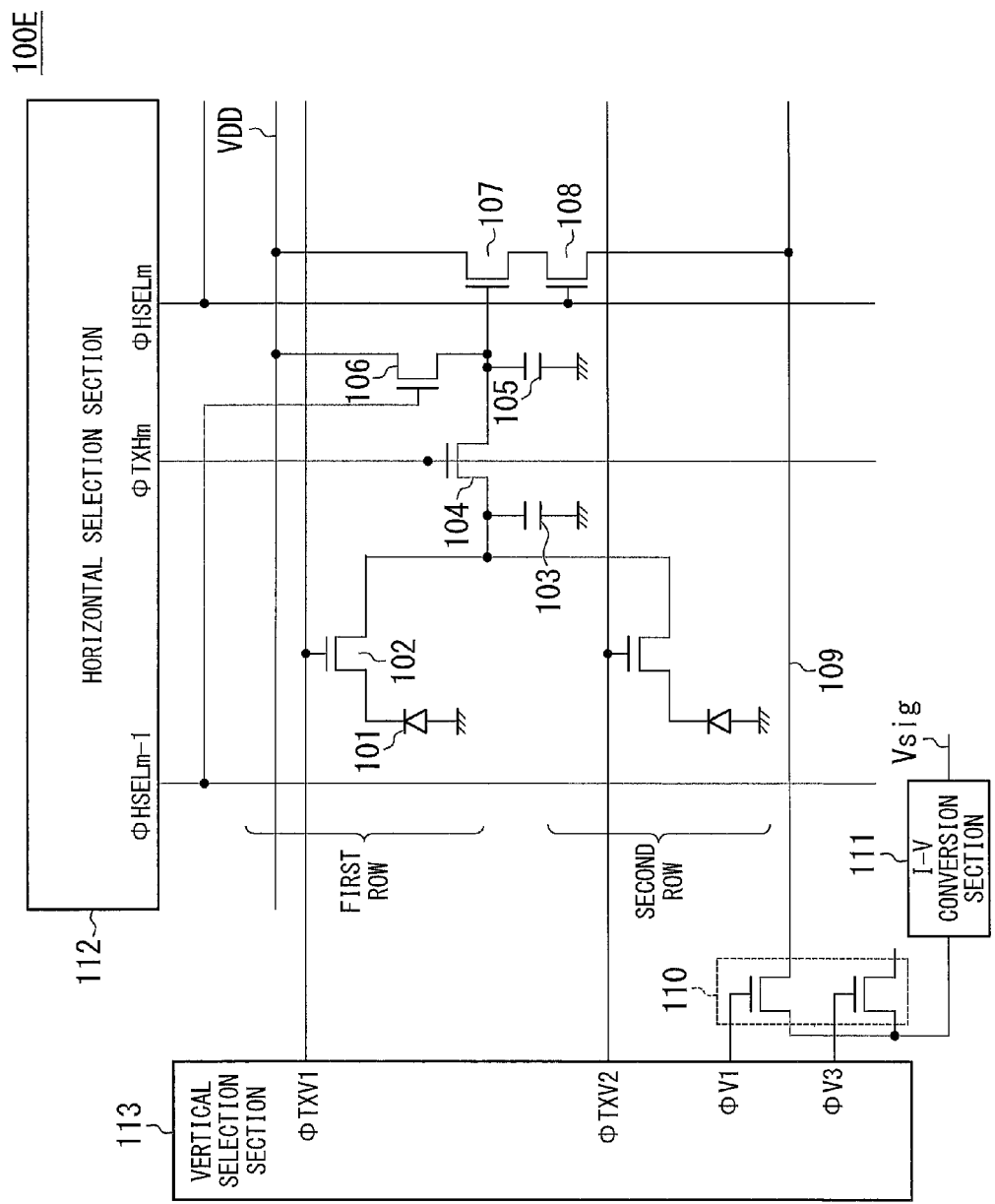
FIG. 10 is a circuit diagram showing a configuration example of a solid-state imaging apparatus according to a fourth embodiment of the present invention.

First, the fourth embodiment of the present invention will be described. FIG. 10 shows a configuration example of a solid-state imaging apparatus 100E according to this embodiment. As shown in FIG. 10, the solid-state imaging apparatus 100E has a photoelectric conversion section 101, a first transfer section 102, a first accumulation section 103, a second transfer section 104, a second accumulation section 105, a reset section 106, an amplification section 107, a selection section 108, an output switch 110, an I-V conversion section 111, a horizontal selection section 112, and a vertical selection section 113.

Hereinafter, differences between the solid-state imaging apparatus 100D shown in FIG. 8 and the solid-state imaging apparatus 100E shown in FIG. 10 will be described. In the solid-state imaging apparatus 100E, the first accumulation section 103 is configured as a capacitor commonly disposed in correspondence with two photoelectric conversion sections 101 adjacent in a column direction (vertical direction) among the plurality of photoelectric conversion sections 101. In addition, the second transfer section 104 is configured as a transistor commonly disposed in correspondence with the two photoelectric conversion sections 101 adjacent in the column direction among the plurality of photoelectric conversion sections 101. That is, in the solid-state imaging apparatus 100E, the first accumulation section 103, the second transfer section 104, the second accumulation section 105, the reset section 106, the amplification section 107, and the selection section 108 are shared between a pixel of a first row and a pixel of a second row adjacent to the pixel of the first row in the column direction.

An operation of the second transfer section 104 is controlled by a second transfer pulse ΦTXH as a control signal supplied from the horizontal selection section 112 to the gate of the second transfer section 104. In FIG. 10, a second transfer pulse ΦTXHm to be supplied to the second transfer section 104 corresponding to the first row and an m$^{th}$ column and the second row and the m$^{th}$ column is shown. Components other than those above are similar to those of the solid-state imaging apparatus 100D.

Figure 11:
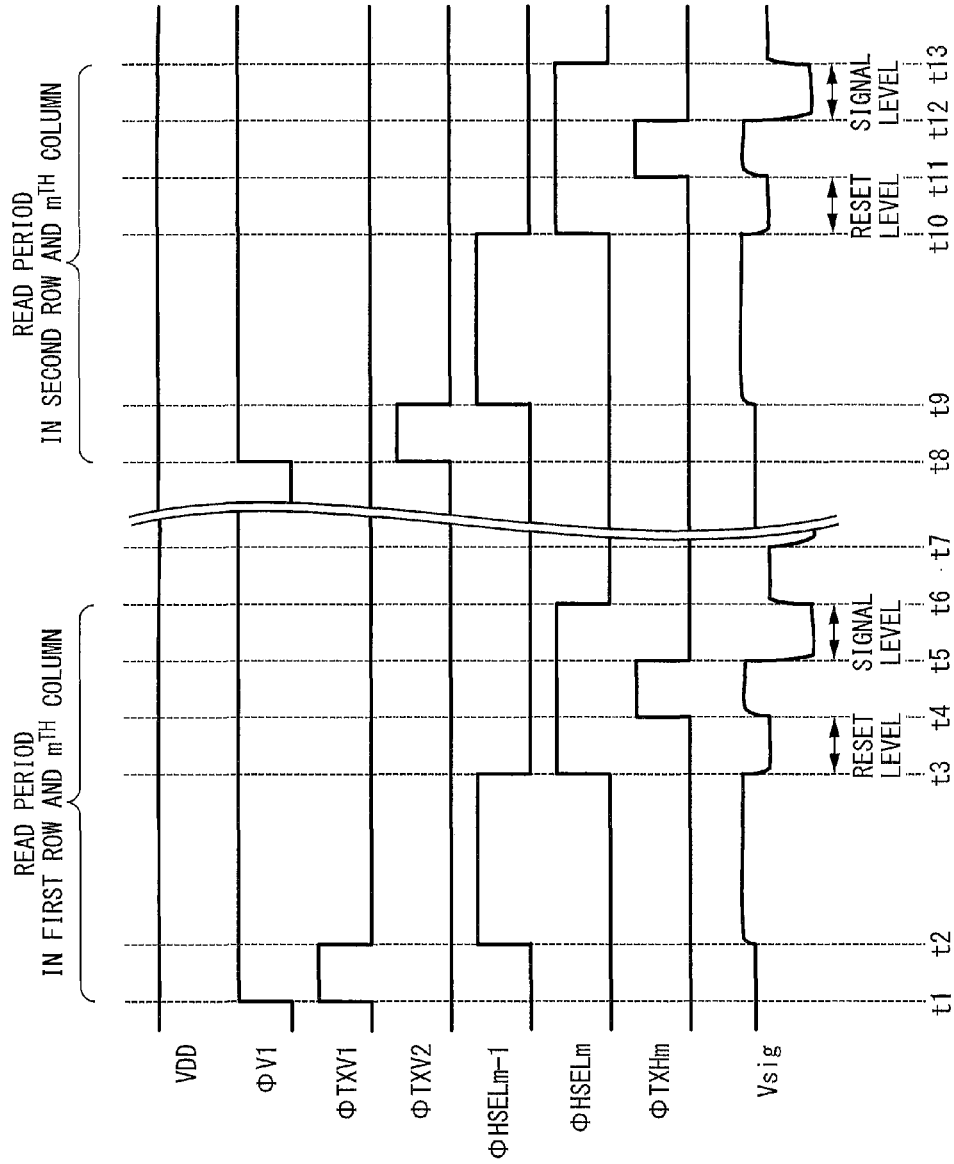
FIG. 11 is a timing chart showing an operation example of the solid-state imaging apparatus according to the fourth embodiment of the present invention.

Next, an operation of the solid-state imaging apparatus 100E will be described. FIG. 11 shows an operation example of the solid-state imaging apparatus 100E. In FIG. 11, waveforms of the power supply voltage VDD, the output pulse ΦV1, the first transfer pulse ΦTXV1, the first transfer pulse ΦTXV2, the selection pulse ΦHSELm−1, the selection pulse ΦHSELm, the second transfer pulse ΦTXHm, and the signal Vsig output from the I-V conversion section 111 are shown. The horizontal direction of FIG. 11 represents time and the vertical direction of FIG. 11 represents a voltage.

Hereinafter, differences from the operation shown in FIG. 9 will be described. At timings t4 and t5, the operation of the second transfer section 104 corresponding to the first row and an m<sup>th</sup> column and the second row and the m<sup>th</sup> column is controlled by the second transfer pulse ΦTXHm in place of the second transfer pulse ΦTXHm(1) in FIG. 9. In addition, at timings t11 and t12, the operation of the second transfer section 104 corresponding to the first row and the m<sup>th</sup> column and the second row and the m<sup>th</sup> column is controlled by the second transfer pulse ΦTXHm in place of the second transfer pulse ΦTXHm(2) in FIG. 9. Operations other than the above operation are similar to those shown in FIG. 9.

Among components of the solid-state imaging apparatus 100E, the output switch 110 and the I-V conversion section 111 are not essential components for achieving the characteristic effects of the solid-state imaging apparatus 100E.

In this embodiment, it is possible to read the second signal of the signal level immediately after the first signal of the reset level is read from the same column of the array of the plurality of photoelectric conversion sections 101. Thus, it is possible to reduce noise due to a change in the low frequency of the power supply voltage VDD. In addition, because some components are shared between two pixels adjacent in the column direction, it is possible to reduce a circuit area. Furthermore, it is possible to further reduce the circuit area as compared with the solid-state imaging apparatus 100D shown in FIG. 8.

(Fifth Embodiment)

Figure 12:
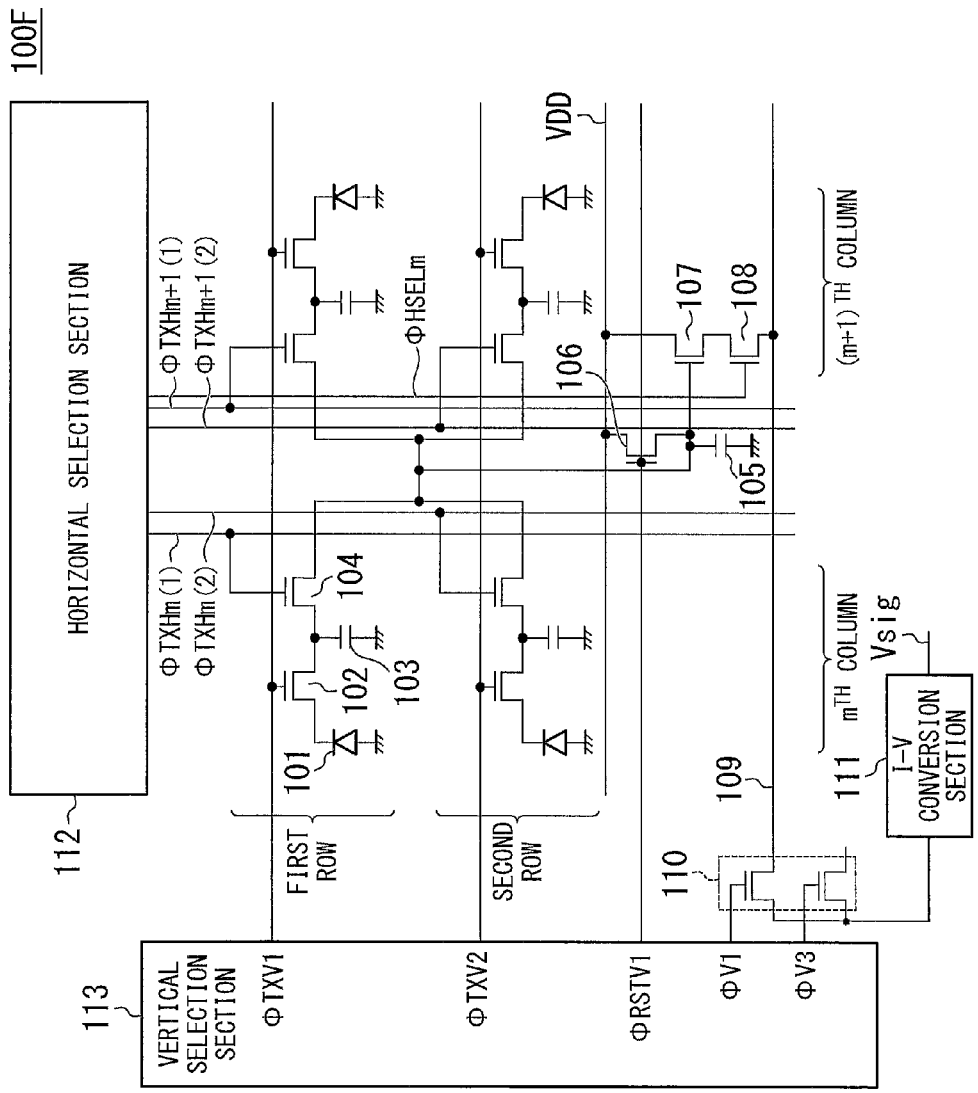
FIG. 12 is a circuit diagram showing a configuration example of a solid-state imaging apparatus according to a fifth embodiment of the present invention.

Next, the fifth embodiment of the present invention will be described. FIG. 12 shows a configuration example of a solid-state imaging apparatus 100F according to this embodiment. As shown in FIG. 12, the solid-state imaging apparatus 100F has a photoelectric conversion section 101, a first transfer section 102, a first accumulation section 103, a second transfer section 104, a second accumulation section 105, a reset section 106, an amplification section 107, a selection section 108, an output switch 110, a conversion section 111, a horizontal selection section 112, and a vertical selection section 113.

Hereinafter, differences between the solid-state imaging apparatus 100A shown in FIG. 1 and the solid-state imaging apparatus 100F shown in FIG. 12 will be described. In the solid-state imaging apparatus 100F, the second accumulation section 105 is configured as a capacitor commonly disposed in correspondence with four photoelectric conversion sections 101 adjacent in a row direction (horizontal direction) and a column direction (vertical direction) among the plurality of photoelectric conversion sections 101. In addition, the reset section 106, the amplification section 107, and the selection section 108 are configured as transistors commonly disposed in correspondence with the four photoelectric conversion sections 101 adjacent in the row direction and the column direction among the plurality of photoelectric conversion sections 101. That is, in the solid-state imaging apparatus 100F, the second accumulation section 105, the reset section 106, the amplification section 107, and the selection section 108 are shared by four pixels adjacent in the row direction and the column direction.

The operation of the reset section 106 is controlled by a reset pulse ΦRSTV as a control signal supplied from the vertical selection section 113 to a gate of the reset section 106. In FIG. 12, a reset pulse ΦRSTV1 to be supplied to the reset section 106 corresponding to the first and second rows is shown.

An operation of the second transfer section 104 is controlled by a second transfer pulse ΦTXH as a control signal supplied from the horizontal selection section 112 to the gate of the second transfer section 104. In FIG. 12, a second transfer pulse ΦTXHm(1) to be supplied to the second transfer section 104 in the first row and an m<sup>th</sup> column, a second transfer pulse ΦTXHm(2) to be supplied to the second transfer section 104 in the second row and the m<sup>th</sup> column, a second transfer pulse ΦTXHm+1(1) to be supplied to the second transfer section 104 in the first row and an (m+1)<sup>th</sup> column, and a second transfer pulse ΦTXHm+1(2) to be supplied to the second transfer section 104 in the second row and the (m+1)<sup>th</sup> column are shown.

The output signal line 109 is disposed for every two rows, that is, in every other row. Components other than those above are similar to those of the solid-state imaging apparatus 100A.

Figure 13:
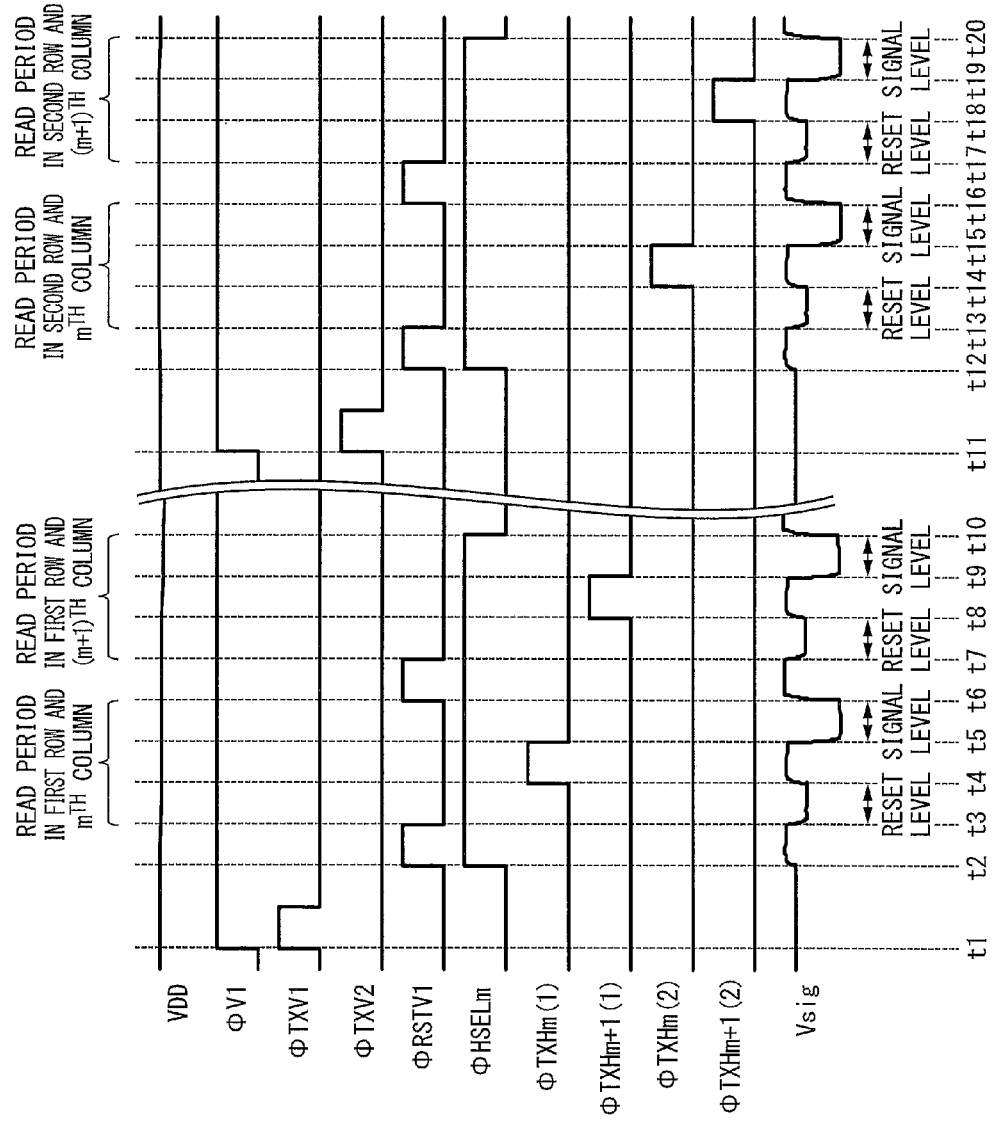
FIG. 13 is a timing chart showing an operation example of the solid-state imaging apparatus according to the fifth embodiment of the present invention.

Next, an operation of the solid-state imaging apparatus 100E will be described. FIG. 13 shows an operation example of the solid-state imaging apparatus 100E. In FIG. 13, waveforms of the power supply voltage VDD, the output pulse ΦV1, the first transfer pulse ΦTXV1, the first transfer pulse ΦTXV2, the reset pulse ΦRSTV1, the selection pulse ΦHSELm, the second transfer pulse ΦTXHm(1), the second transfer pulse ΦTXHm+1(1), the second transfer pulse ΦTXHm(2), the second transfer pulse ΦTXHm+1(2), and the signal Vsig output from the I-V conversion section 111 are shown. The horizontal direction of FIG. 13 represents time and the vertical direction of FIG. 13 represents a voltage.

(Timing t1)

The output pulse ΦV1 changes from the Low level to the High level and therefore the transistors corresponding to the first and second rows among a plurality of transistors constituting the output switch 110 are in the ON state. Simultaneously, the first transfer pulse ΦTXV1 changes from the Low level to the High level and therefore all the first transfer sections 102 of the first row are in the ON state. Thereby, a signal charge is transferred from all the photoelectric conversion sections 101 of the first row to the first accumulation section 103.

Thereafter, the first transfer pulse ΦTXV1 changes from the High level to the Low level at a timing between timing t1 and timing t2 and therefore all the first transfer sections 102 of the first row are in the OFF state.

(Timing t2)

The reset pulse ΦRSTV1 changes from the Low level to the High level and therefore all reset sections 106 corresponding to the first and second rows are in the ON state. Thereby, a signal charge accumulated in all second accumulation sections 105 corresponding to the first and second rows is reset. Simultaneously, the selection pulse ΦHSELm changes from the Low level to the High level and therefore the selection section 108 corresponding to the m<sup>th</sup> and (m+1)<sup>th</sup> columns is in the ON state.

(Timing t3)

The reset pulse ΦRSTV1 changes from the High level to the Low level and therefore all the reset sections 106 corresponding to the first and second rows are in the OFF state. Because the selection section 108 corresponding to the m<sup>th</sup> and (m+1)<sup>th</sup> columns is in the ON state, the signal of the reset level is output to the output signal line 109 corresponding to the first and second rows. A current based on this signal is converted into a voltage by the I-V conversion section 111. The I-V conversion section 111 outputs the signal Vsig corresponding to the reset level in the first row and the m<sup>th</sup> column.

(Timing t4)

The second transfer pulse ΦTXHm(1) changes from the Low level to the High level and therefore the second transfer section 104 in the first row and the m<sup>th</sup> column is in the ON state. Thereby, a potential of the first accumulation section 103 in the first row and the $m^{th}$ column is the same as a potential of the second accumulation section 105 corresponding to the first and second rows and the $m^{th}$ and $(m+1)^{th}$ columns. That is, the signal charge accumulated in the first accumulation section 103 is transferred to the second accumulation section 105.

(Timing t5)

The second transfer pulse ΦTXHm(1) changes from the High level to the Low level and therefore the second transfer section 104 in the first row and the $m^{th}$ column is in the OFF state. Thereby, the signal of the signal level is output to the output signal line 109 corresponding to the first and second rows. A current based on this signal is converted into a voltage by the I-V conversion section 111. The I-V conversion section 111 outputs the signal Vsig corresponding to the signal level in the first row and the $m^{th}$ column.

(Timing t6)

The reset pulse ΦRSTV1 changes from the Low level to the High level and therefore all the reset sections 106 corresponding to the first and second rows are in the ON state. Thereby, a signal charge accumulated in all second accumulation sections 105 corresponding to the first and second rows is reset.

(Timing t7)

The reset pulse ΦRSTV1 changes from the High level to the Low level and therefore all the reset sections 106 corresponding to the first and second rows are in the OFF state. Because the selection section 108 corresponding to the $m^{th}$ and $(m+1)^{th}$ columns is in the ON state, the signal of the reset level is output to the output signal line 109 corresponding to the first and second rows. A current based on this signal is converted into a voltage by the I-V conversion section 111. The I-V conversion section 111 outputs the signal Vsig corresponding to the reset level in the first row and the $(m+1)^{th}$ column.

(Timing t8)

The second transfer pulse ΦTXHm+1(1) changes from the Low level to the High level and therefore the second transfer section 104 in the first row and the $(m+1)^{th}$ column is in the ON state. Thereby, a potential of the first accumulation section 103 in the first row and the $(m+1)^{th}$ column is the same as a potential of the second accumulation section 105 corresponding to the $m^{th}$ and $(m+1)^{th}$ columns of the first and second rows.

That is, the signal charge accumulated in the first accumulation section 103 is transferred to the second accumulation section 105.

(Timing t9)

The second transfer pulse ΦTXHm+1(1) changes from the High level to the Low level and therefore the second transfer section 104 in the first row and the $(m+1)^{th}$ column is in the OFF state. Thereby, the signal of the signal level is output to the output signal line 109 corresponding to the first and second rows. A current based on this signal is converted into a voltage by the I-V conversion section 111. The I-V conversion section 111 outputs the signal Vsig corresponding to the reset level in the first row and the $(m+1)^{th}$ column.

(Timing t10)

The selection pulse ΦHSELm changes from the High level to the Low level and therefore the selection section 108 corresponding to the $m^{th}$ and $(m+1)^{th}$ columns is in the OFF state. Thereby, the reading of signals corresponding to the $m^{th}$ and $(m+1)^{th}$ columns ends.

Subsequently, signals of the $(m+2)^{th}$ and $(m+3)^{th}$ columns are read. The reading of the signals of the $(m+2)^{th}$ and $(m+3)^{th}$ columns is similar to the reading of the signals of the $m^{th}$ and $(m+1)^{th}$ columns. That is, for the $(m+2)^{th}$ and $(m+3)^{th}$ columns, an operation similar to the operation from timing t2 to timing t10 is performed. Likewise, signals are read column by column. In the operation shown in FIG. 13, the first signal and the second signal related to the second column adjacent to the first column are output after the first signal and the second signal related to the first column of the array of the plurality of photoelectric conversion sections 101 are output.

After signals are read from all columns of the first row, the output pulse ΦV1 changes from the High level to the Low level and therefore transistors corresponding to the first and second rows among a plurality of transistors constituting the output switch 110 are in the OFF state.

(Timing t11)

The output pulse ΦV1 changes from the Low level to the High level and therefore transistors corresponding to the first and second rows among a plurality of transistors constituting the output switch 110 are in the ON state. Simultaneously, the first transfer pulse ΦTXV2 changes from the Low level to the High level and therefore all the first transfer sections 102 of the second row are in the ON state. Thereby, a signal charge is transferred from all the photoelectric conversion sections 101 of the second row to the first accumulation section 103.

Thereafter, the first transfer pulse ΦTXV2 changes from the High level to the Low level at a timing between timing t11 and timing t12 and therefore all the first transfer sections 102 of the second row are in the OFF state.

(Timing t12)

The reset pulse ΦRSTV1 changes from the Low level to the High level and therefore all reset sections 106 corresponding to the first and second rows are in the ON state. Thereby, a signal charge accumulated in all second accumulation sections 105 corresponding to the first and second rows is reset. Simultaneously, the selection pulse ΦHSELm changes from the Low level to the High level and therefore the selection section 108 corresponding to the $m^{th}$ and $(m+1)^{th}$ columns is in the ON state.

(Timing t13)

The reset pulse ΦRSTV1 changes from the High level to the Low level and therefore all the reset sections 106 corresponding to the first and second rows are in the OFF state. Because the selection section 108 corresponding to the $m^{th}$ and $(m+1)^{th}$ columns is in the ON state, the signal of the reset level is output to the output signal line 109 corresponding to the first and second rows. A current based on this signal is converted into a voltage by the I-V conversion section 111. The I-V conversion section 111 outputs the signal Vsig corresponding to the reset level in the second row and the $m^{th}$ column.

(Timing t14)

The second transfer pulse ΦTXHm(2) changes from the Low level to the High level and therefore the second transfer section 104 in the second row and the $m^{th}$ column is in the ON state. Thereby, a potential of the first accumulation section 103 in the second row and the $m^{th}$ column is the same as a potential of the second accumulation section 105 corresponding to the $m^{th}$ and $(m+1)^{th}$ columns of the first and second rows. That is, the signal charge accumulated in the first accumulation section 103 is transferred to the second accumulation section 105.

(Timing t15)

The second transfer pulse ΦTXHm(2) changes from the High level to the Low level and therefore the second transfer section 104 in the second row and the $m^{th}$ column is in the OFF state. Thereby, the signal of the signal level is output to the output signal line 109 corresponding to the first and second rows. A current based on this signal is converted into a voltage by the I-V conversion section 111. The I-V conversion section 111 outputs the signal Vsig corresponding to the signal level in the second row and the $m^{th}$ column.

(Timing t16)

The reset pulse ΦRSTV1 changes from the Low level to the High level and therefore all the reset sections 106 corresponding to the first and second rows are in the ON state. Thereby, a signal charge accumulated in all the second accumulation sections 105 corresponding to the first and second rows is reset.

(Timing t17)

The reset pulse ΦRSTV1 changes from the High level to the Low level and therefore all the reset sections 106 corresponding to the first and second rows are in the OFF state. Because the selection section 108 corresponding to the $m^{th}$ and $(m+1)^{th}$ columns is in the ON state, the signal of the reset level is output to the output signal line 109 corresponding to the first and second rows. A current based on this signal is converted into a voltage by the I-V conversion section 111. The I-V conversion section 111 outputs the signal Vsig corresponding to the reset level in the second row and the $(m+1)^{th}$ column.

(Timing t18)

The second transfer pulse ΦTXHm+1(2) changes from the Low level to the High level and therefore the second transfer section 104 in the first row and the $(m+1)^{th}$ column is in the ON state. Thereby, a potential of the first accumulation section 103 in the second row and the $(m+1)^{th}$ column is the same as a potential of the second accumulation section 105 corresponding to the $m^{th}$ and $(m+1)^{th}$ columns of the first and second rows.

That is, the signal charge accumulated in the first accumulation section 103 is transferred to the second accumulation section 105.

(Timing t19)

The second transfer pulse ΦTXHm+1(2) changes from the High level to the Low level and therefore the second transfer section 104 in the second row and the $(m+1)^{th}$ column is in the OFF state. Thereby, the signal of the signal level is output to the output signal line 109 corresponding to the first and second rows. A current based on this signal is converted into a voltage by the I-V conversion section 111. The I-V conversion section 111 outputs the signal Vsig corresponding to the signal level in the second row and the $(m+1)^{th}$ column.

(Timing t20)

The selection pulse ΦHSELm changes from the High level to the Low level and therefore the selection section 108 corresponding to the $m^{th}$ and $(m+1)^{th}$ columns is in the OFF state. Thereby, the reading of signals corresponding to the $m^{th}$ and $(m+1)^{th}$ columns ends.

Subsequently, signals of the $(m+2)^{th}$ and $(m+3)^{th}$ columns are read. The reading of the signals of the $(m+2)^{th}$ and $(m+3)^{th}$ columns is similar to the reading of the signals of the $m^{th}$ and $(m+1)^{th}$ columns. That is, for the $(m+2)^{th}$ and $(m+3)^{th}$ columns, an operation similar to the operation from timing t12 to timing t20 is performed. Likewise, signals are read column by column.

After signals are read from all columns of the second row, signals are read from columns of the third row. Thereafter, an operation similar to the above is performed for every row of the array of the plurality of photoelectric conversion sections 101.

As in the operation shown in FIG. 7, after the first signal of the reset level and the second signal of the signal level of the even-numbered column of one row are read, the first and second signals of the odd-numbered column of the same row may be read. In addition, after the first and second signals of the odd-numbered column of one row are read, the first and second signals of the even-numbered column of the same row may be read. Thereby, it is possible to read signals at a speed higher than that in the operation shown in FIG. 13.

Among components of the solid-state imaging apparatus 100F, the output switch 110 and the I-V conversion section 111 are not essential components for achieving the characteristic effects of the solid-state imaging apparatus 100F.

In this embodiment, it is possible to read the second signal of the signal level immediately after the first signal of the reset level is read from the same column of the array of the plurality of photoelectric conversion sections 101. Thus, it is possible to reduce noise due to a change in the low frequency of the power supply voltage VDD. In addition, because some components are shared by four pixels adjacent in the row direction and the column direction, it is possible to reduce a circuit area.

(Sixth Embodiment)

Figure 14:
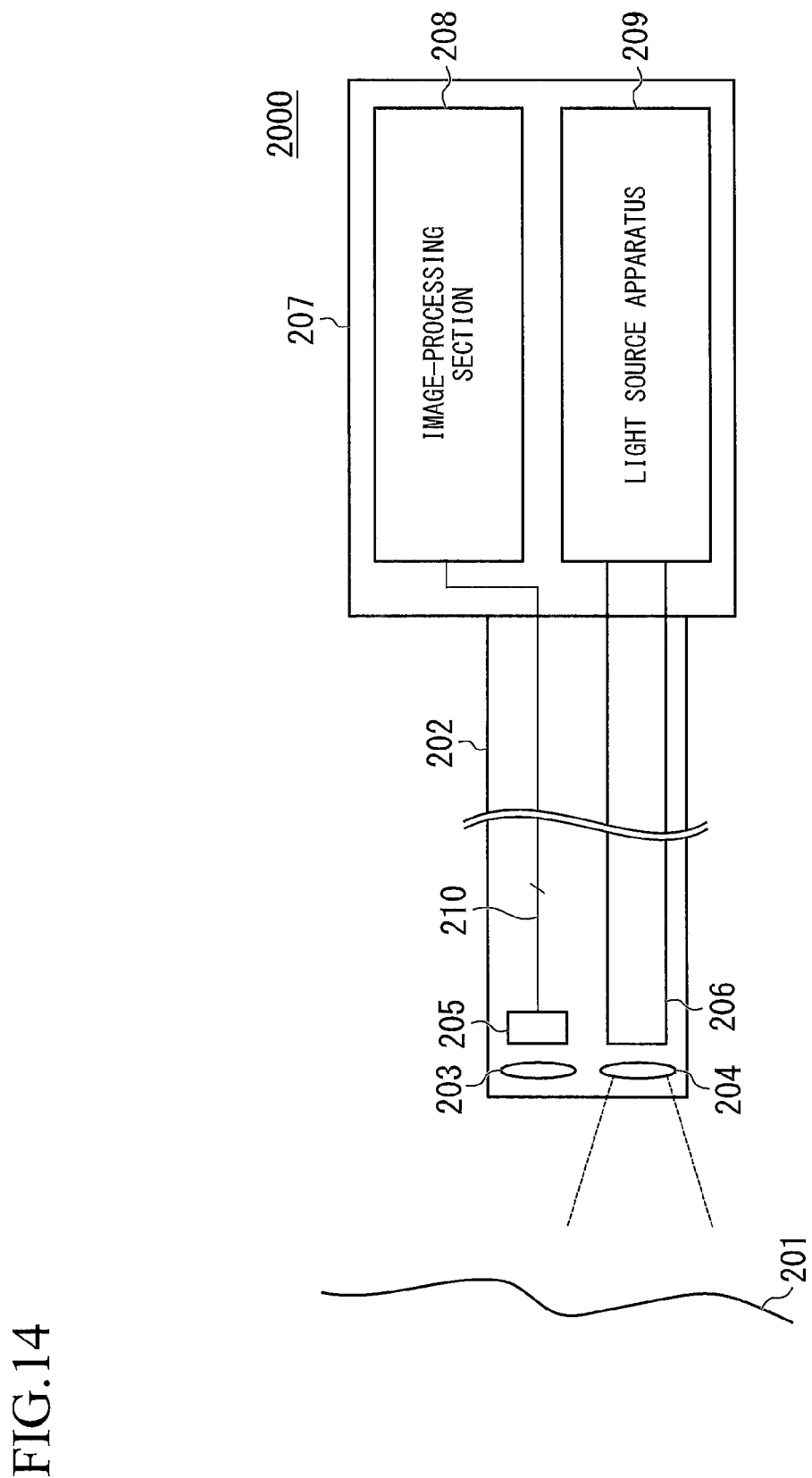
FIG. 14 is a block diagram showing a configuration example of an endoscope apparatus according to a sixth embodiment of the present invention.
Figure 15:
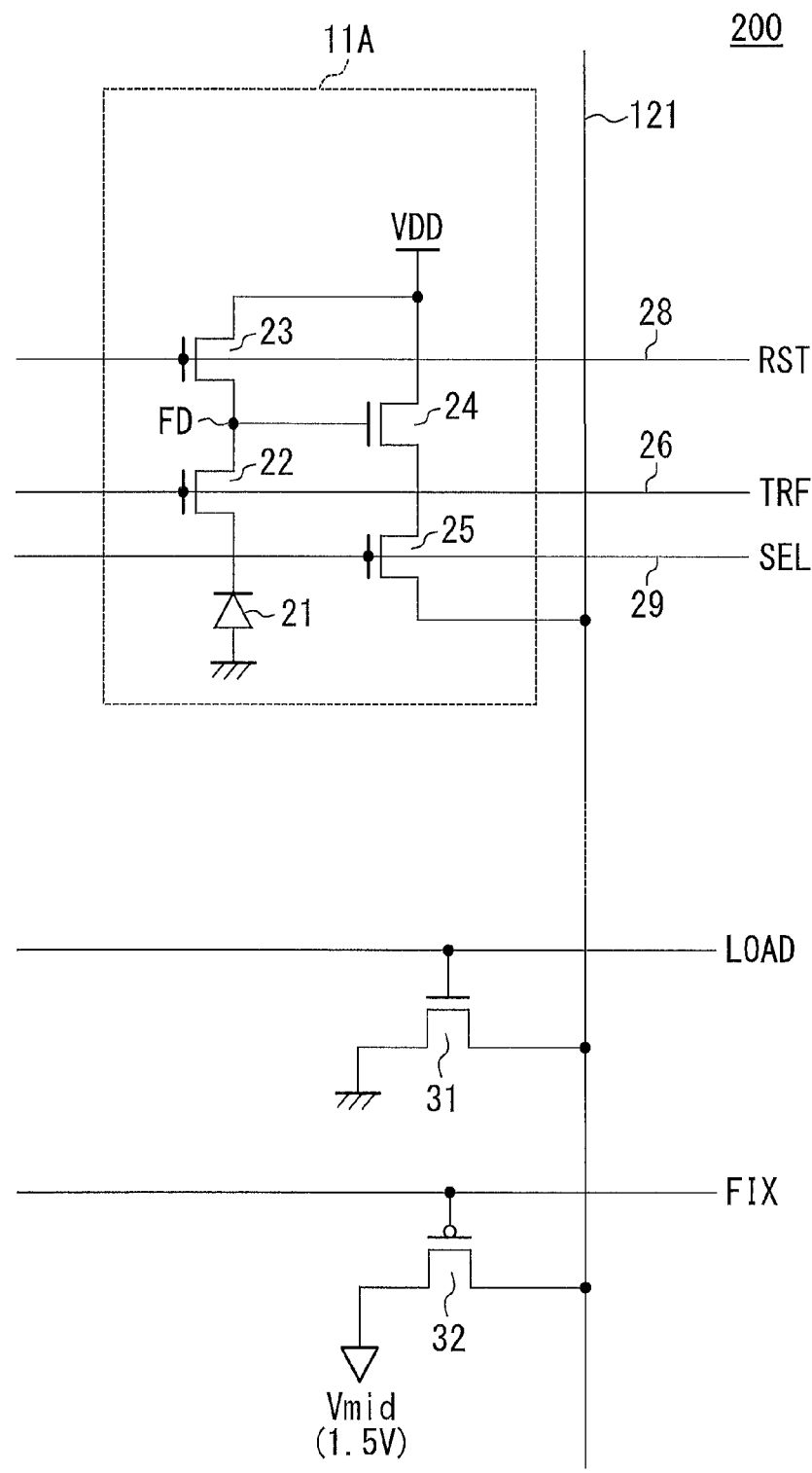
FIG. 15 is a circuit diagram showing a configuration example of a conventional solid-state imaging apparatus.
Figure 16:
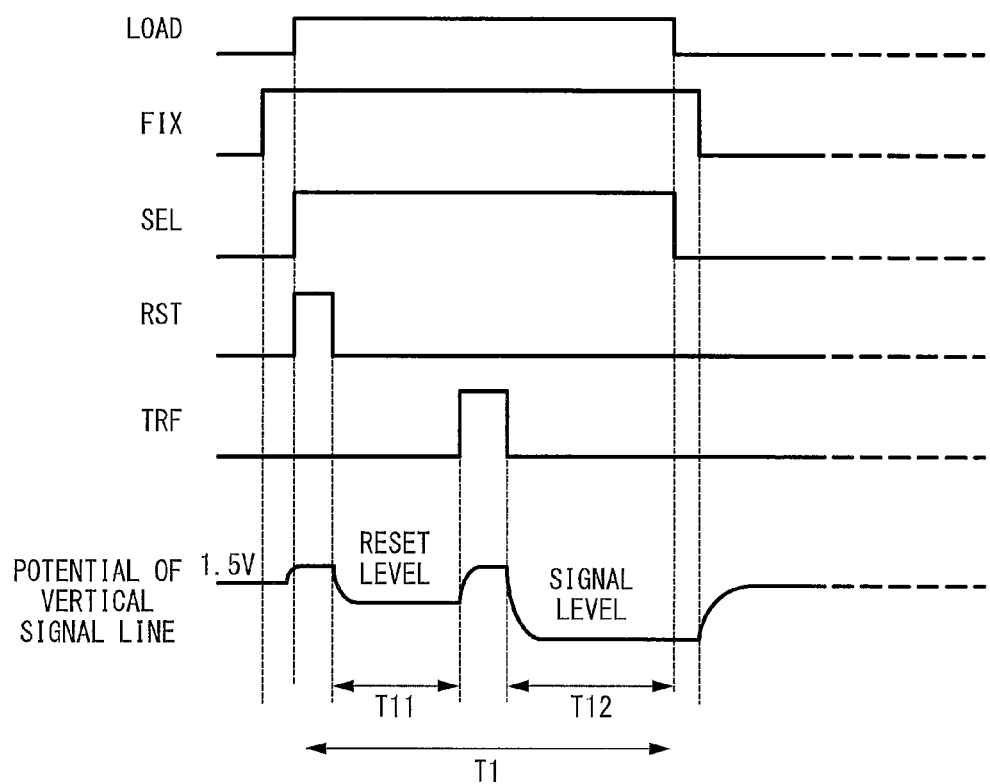
FIG. 16 is a timing chart showing an operation example of the conventional solid-state imaging apparatus.

Next, the sixth embodiment of the present invention will be described. FIG. 14 shows a configuration example of an endoscope apparatus 2000 according to this embodiment. As shown in FIG. 14, the endoscope apparatus 2000 has a scope 202 and a housing 207.

The scope 202 has a lens 203, a lens 204, a solid-state imaging apparatus 205, a fiber 206, and a cable 210. The lens 203 forms an image of reflected light from an object 201 on the solid-state imaging apparatus 205. The lens 204 radiates illumination light to the object 201. The solid-state imaging apparatus 205 is the solid-state imaging apparatus according to any one of the first to fifth embodiments. The fiber 206 transmits the illumination light to the object 201. The cable 210 has a small-diameter cable which supplies an input signal such as a power supply voltage, a clock, or the like to the solid-state imaging apparatus 205 and a small-diameter cable which transfers a signal output from the solid-state imaging apparatus 205 to an image-processing section 208.

The housing 207 has the image-processing section 208 and a light source apparatus 209. The image-processing section 208 performs a predetermined process on a signal output from the solid-state imaging apparatus 205 to generate a captured image. The light source apparatus 209 includes a light source which generates illumination light to be radiated to the object.

According to this embodiment, the endoscope apparatus 2000 having the solid-state imaging apparatus 205 according to any one of the first to fifth embodiments is configured.

In this embodiment, it is possible to reduce noise due to a change in the low frequency of the power supply voltage VDD inside the endoscope apparatus 2000.

(Modified Example Commonly Applicable to First to Fifth Embodiments)

Next, a modified example commonly applicable to the first to fifth embodiments will be described. In the first to fifth embodiments, a signal read scheme is a current read scheme. The signal read scheme may be other schemes. For example, the signal read scheme may be a voltage read scheme. However, in the case of the voltage read scheme, it is necessary to provide a buffer such as a source follower in the output signal line and a circuit area and current consumption increase. Thus, the current read scheme is preferable.

In addition, the first accumulation section 103 and the second accumulation section 105 in the first to fifth embodiments may be capacitors including a floating diffusion region.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A solid-state imaging apparatus, comprising:
a plurality of photoelectric conversion sections configured to generate a signal charge according to an amount of an incident light and disposed in a matrix;
a first accumulation section configured to accumulate the signal charge;
a first transfer section configured to transfer the signal charge from the photoelectric conversion sections to the first accumulation section;
a second accumulation section configured to accumulate the signal charge accumulated in the first accumulation section;
a second transfer section configured to transfer the signal charge accumulated in the first accumulation section to the second accumulation section;
a reset section configured to reset the signal charge accumulated in the second accumulation section;
an output section configured to output a signal according to the signal charge accumulated in the second accumulation section to an output signal line;
a first control section configured to control the second transfer section, the reset section, and the output section for every column of an array of the plurality of photoelectric conversion sections; and
a second control section configured to control the first transfer section for every row of the array,
wherein the first transfer section transfers the signal charge in a first period,
wherein the reset section resets the signal charge in a second period different from the first period,
wherein the output section outputs a first signal according to the reset signal charge in a third period after the second period,
wherein the second transfer section transfers the signal charge in a fourth period after the first and the third period,
wherein the output section outputs a second signal according to the transferred signal charge in a fifth period after the fourth period, and
wherein, after the first signal and the second signal related to a first column of the array are output, the first signal and the second signal related to a second column different from the first column are output.

2. The solid-state imaging apparatus according to claim 1, wherein the first accumulation section includes a first capacitor disposed in correspondence with each of the plurality of photoelectric conversion sections,
wherein the first transfer section includes a first transistor disposed in correspondence with each of the plurality of photoelectric conversion sections,
wherein the second accumulation section includes a second capacitor disposed in correspondence with each of the plurality of photoelectric conversion sections,
wherein the second transfer section includes a second transistor disposed in correspondence with each of the plurality of photoelectric conversion sections,
wherein the reset section includes a third transistor disposed in correspondence with each of the plurality of photoelectric conversion sections, and
wherein the output section includes a fourth transistor disposed in correspondence with each of the plurality of photoelectric conversion sections.

3. The solid-state imaging apparatus according to claim 1,
wherein the first accumulation section includes a first capacitor disposed in correspondence with each of the plurality of photoelectric conversion sections,
wherein the first transfer section includes a first transistor disposed in correspondence with each of the plurality of photoelectric conversion sections,
wherein the second accumulation section includes a second capacitor commonly disposed in correspondence with two photoelectric conversion sections adjacent in a row direction of the array among the plurality of photoelectric conversion sections,
wherein the second transfer section includes a second transistor disposed in correspondence with each of the plurality of photoelectric conversion sections,
wherein the reset section includes a third transistor commonly disposed in correspondence with the two photoelectric conversion sections adjacent in the row direction of the array among the plurality of photoelectric conversion sections, and
wherein the output section includes a fourth transistor commonly disposed in correspondence with the two photoelectric conversion sections adjacent in the row direction of the array among the plurality of photoelectric conversion sections.

4. The solid-state imaging apparatus according to claim 1,
wherein the first transfer section includes a first transistor disposed in correspondence with each of the plurality of photoelectric conversion sections,
wherein the second accumulation section includes a second capacitor commonly disposed in correspondence with two photoelectric conversion sections adjacent in a column direction of the array among the plurality of photoelectric conversion sections,
wherein the reset section includes a third transistor commonly disposed in correspondence with the two photoelectric conversion sections adjacent in the column direction of the array among the plurality of photoelectric conversion sections, and
wherein the output section includes a fourth transistor commonly disposed in correspondence with the two photoelectric conversion sections adjacent in the column direction of the array among the plurality of photoelectric conversion sections.

5. The solid-state imaging apparatus according to claim 4,
wherein the first accumulation section includes a first capacitor disposed in correspondence with each of the plurality of photoelectric conversion sections, and
wherein the second transfer section includes a second transistor disposed in correspondence with each of the plurality of photoelectric conversion sections.

6. The solid-state imaging apparatus according to claim 4,
wherein the first accumulation section includes a first capacitor commonly disposed in correspondence with the two photoelectric conversion sections adjacent in the column direction of the array among the plurality of photoelectric conversion sections, and
wherein the second transfer section includes a second transistor commonly disposed in correspondence with the two photoelectric conversion sections adjacent in the column direction of the array among the plurality of photoelectric conversion sections.

7. The solid-state imaging apparatus according to claim 2, wherein the signal charge related to the second column adjacent to the first column is reset simultaneously when the first signal related to the first column of the array is output, and subsequently the first signal and the second signal related to the second column are output after the second signal related to the first column is output.

8. The solid-state imaging apparatus according to claim 5, wherein the signal charge related to the second column adjacent to the first column is reset simultaneously when the first signal related to the first column of the array is output, and subsequently the first signal and the second signal related to the second column are output after the second signal related to the first column is output.

9. The solid-state imaging apparatus according to claim 6, wherein the signal charge related to the second column adjacent to the first column is reset simultaneously when the first signal related to the first column of the array is output, and subsequently the first signal and the second signal related to the second column are output after the second signal related to the first column is output.

10. The solid-state imaging apparatus according to claim 1,
wherein the first accumulation section has a first capacitor disposed in correspondence with each of the plurality of photoelectric conversion sections,
wherein the first transfer section has a first transistor disposed in correspondence with each of the plurality of photoelectric conversion sections,
wherein the second accumulation section has a second capacitor commonly disposed in correspondence with four photoelectric conversion sections adjacent in row and column directions of the array among the plurality of photoelectric conversion sections,
wherein the second transfer section has a second transistor disposed in correspondence with each of the plurality of photoelectric conversion sections,
wherein the reset section has a third transistor commonly disposed in correspondence with the four photoelectric conversion sections adjacent in the row and column directions of the array among the plurality of photoelectric conversion sections, and
wherein the output section has a fourth transistor commonly disposed in correspondence with the four photoelectric conversion sections adjacent in the row and column directions of the array among the plurality of photoelectric conversion sections.

11. The solid-state imaging apparatus according to claim 3, wherein, after the first signal and the second signal related to the first column of the array are output, the first signal and the second signal related to a second column adjacent to the first column are output.

12. The solid-state imaging apparatus according to claim 8, wherein, after the first signal and the second signal related to the first column of the array are output, the first signal and the second signal related to a second column adjacent to the first column are output.

13. The solid-state imaging apparatus according to claim 3, wherein, after the signal charge related to the first column which is one of an even-numbered column and an odd-numbered column of the array and the signal charge related to the second column which is the other of the even-numbered column and the odd-numbered column are simultaneously reset, the first signal and the second signal related to the first column are output and subsequently the first signal and the second signal related to the second column are output.

14. The solid-state imaging apparatus according to claim 8, wherein, after the signal charge related to the first column which is one of an even-numbered column and an odd-numbered column of the array and the signal charge related to the second column which is the other of the even-numbered column and the odd-numbered column are simultaneously reset, the first signal and the second signal related to the first column are output and subsequently the first signal and the second signal related to the second column are output.

15. An endoscope apparatus comprising: the solid-state imaging apparatus according to claim 1.

* * * * *